US011070984B2

(12) United States Patent
Yoon et al.

(10) Patent No.: US 11,070,984 B2
(45) Date of Patent: Jul. 20, 2021

(54) LICENSED ASSISTED ACCESS BASED ON LOW UTILIZATION OF UNLICENSED CHANNELS

(71) Applicant: T-Mobile USA, Inc., Bellevue, WA (US)

(72) Inventors: Jong Sung Yoon, Sammamish, WA (US); Jie Hui, Mercer Island, WA (US); Antoine T. Tran, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 56 days.

(21) Appl. No.: 16/368,627

(22) Filed: Mar. 28, 2019

(65) Prior Publication Data

US 2019/0306722 A1    Oct. 3, 2019

Related U.S. Application Data

(60) Provisional application No. 62/650,994, filed on Mar. 30, 2018.

(51) Int. Cl.
*H04W 16/14* (2009.01)
*H04W 24/10* (2009.01)
*H04W 64/00* (2009.01)

(52) U.S. Cl.
CPC .......... *H04W 16/14* (2013.01); *H04W 24/10* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 2015/0181507 A1* | 6/2015 | Park | H04W 52/0229 370/311 |
| 2016/0088441 A1 | 3/2016 | Mohammad Mirzaei et al. | |
| 2017/0150382 A1* | 5/2017 | Martin | H04W 72/042 |
| 2017/0303220 A1 | 10/2017 | Sadeghi et al. | |
| 2017/0332353 A1* | 11/2017 | Viorel | H04W 72/082 |
| 2017/0339588 A1* | 11/2017 | Moon | H04W 88/02 |
| 2018/0035457 A1 | 2/2018 | Ngo et al. | |
| 2020/0228997 A1* | 7/2020 | Chen | H04W 16/14 |

OTHER PUBLICATIONS

Huawei et al, "BSS Load Information in 802.11ax", 802.11-17-361r0, EEE Standards Association docs, Mar. 15, 2017, 15 pages.
The PCT Search Report and Written Opinion dated Aug. 8, 2019 for PCT Application No. PCT/US2019/024889, 12 pages.

* cited by examiner

*Primary Examiner* — Rebecca E Song
(74) *Attorney, Agent, or Firm* — Lee & Hayes, P.C.

(57) ABSTRACT

A computing device of a telecommunication network can receive crowd-sourced Wi-Fi reports submitted by user equipment based on scans for beacon signals broadcast by Wi-Fi access points. From the crowd-sourced Wi-Fi reports, the computing device can determine when Licensed Assisted Access (LAA) transmissions over channels of an unlicensed spectrum are safe and are not expected to interfere with Wi-Fi transmissions.

17 Claims, 19 Drawing Sheets

Heat Maps 500

U-NII-1 + U-NII-3 (9 Channels, 180 MHz)

- 9 Channels Free
- 8 Channels Free
- 7 Channels Free
- 6 Channels Free
- 5 Channels Free
- 4 Channels Free
- 3 Channels Free
- 2 Channels Free
- 1 Channel Free
- Fully Occupied U-NII-2A + U-NII-2C (16 Channels, 320 MHz)

- 15 or 16 Channels Free
- 13-15 Channels Free
- 11-13 Channels Free
- 9-11 Channels Free
- 7-9 Channels Free
- 5-7 Channels Free
- 3-5 Channels Free
- 1-3 Channels Free
- Fully Occupied

| Channel | Average Channel Utilization 802 |
|---|---|
| Channel 36 | 40% |
| Channel 40 | 50% |
| Channel 44 | 60% |
| Channel 48 | 70% |

| Set of Consecutive Channels | Probability Calculation | Probability of All 3 Channels Being Free |
|---|---|---|
| Channels 36, 40, and 44 | (1 - 0.4) * (1 - 0.5) * (1 - 0.6) = 0.12 | 12% |
| Channels 40, 44, and 48 | (1 - 0.5) * (1 - 0.6) * (1 - 0.7) = 0.06 | 6% |

| Frequency Band | Probability Calculation | Probability of 3 Consecutive Channels Being Free |
|---|---|---|
| U-NII-1 Band | 1 - (1 - 0.12) * (1 - 0.06) = 0.1728 | 17.28% |
| U-NII-2A Band | ... | ... |
| U-NII-2C Band | ... | ... |
| U-NII-3 Band | ... | ... |

FIG. 11

LICENSED ASSISTED ACCESS BASED ON LOW UTILIZATION OF UNLICENSED CHANNELS

RELATED APPLICATIONS

This U.S. patent application claims priority to provisional U.S. Patent Application No. 62/650,994, entitled "MEASURING UNLICENSED 5 GHZ BAND UTILIZATION TO ESTIMATE GAIN FROM LAA (LICENSED ASSISTED ACCESS) BY ANALYZING CROWD SOURCED WIFI BEACON SIGNALS WITH LOCATION INFORMATION," filed on Mar. 30, 2018, the entirety of which is incorporated herein by reference.

BACKGROUND

User equipment (UE) and base stations of a telecommunication network primarily communicate with each other wirelessly using frequencies in a licensed spectrum. For example, UEs and base stations can exchange Long-Term Evolution (LTE) transmissions over frequencies in a band that has been licensed by an operator of a telecommunication network for LTE transmissions.

However, in some cases UEs and base stations can also exchange data over frequencies in an unlicensed spectrum. For example, Licensed Assisted Access (LAA) technology can be used to send LTE transmissions over frequencies in the unlicensed spectrum that are often used for Wi-Fi transmissions. When UEs and base stations send LTE transmissions over both licensed and unlicensed frequencies, bandwidth can be increased relative to sending data over the licensed frequencies alone.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 11 depicts an example of carrier aggregation probability calculations.

DETAILED DESCRIPTION

Introduction

Figure 1:
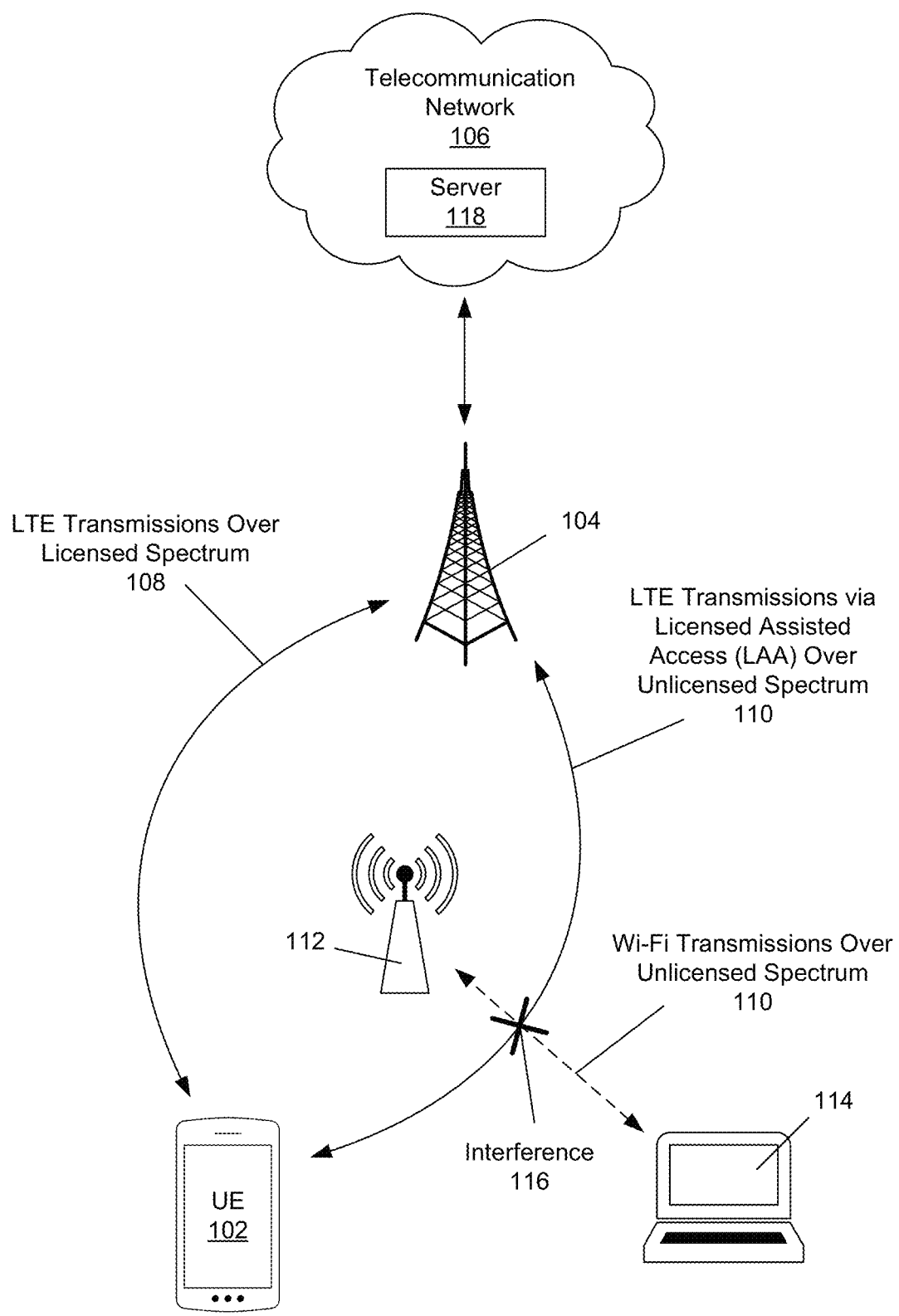
FIG. 1 depicts an example environment in which user equipment (UE) can connect to base stations of a telecommunication network over channels in a licensed spectrum as well as channels of an unlicensed spectrum that may also be used for Wi-Fi transmissions.

In a wireless telecommunication network, user equipment (UE) and network equipment primarily communicate with each other wirelessly using frequencies within one or more spectrums that have been licensed by an operator of the wireless telecommunication network. However, in some cases communications between UEs and network equipment can also, or alternately, exchange data using unlicensed frequencies, such as frequencies often used for Wi-Fi communications.

For example, although communications in a Long-Term Evolution (LTE) network may use frequencies in specific bands that have been licensed by an operator of the LTE network for LTE transmissions, Licensed Assisted Access (LAA) technology can also be used to send LTE transmissions over frequencies in an unlicensed spectrum. In some examples, carrier aggregation (CA) can be used to send data over both licensed frequencies and unlicensed frequencies using LAA, thereby increasing bandwidth relative to sending data over licensed frequencies alone. The increase in bandwidth due to LAA transmissions in the unlicensed spectrum in addition to regular LTE transmissions in the licensed spectrum can be referred to as the gain due to LAA.

However, LAA transmissions can potentially interfere with Wi-Fi transmissions when both types of transmissions use the same channels in the unlicensed spectrum. Wi-Fi transmissions generally use channels in a 2.4 GHz band of frequencies in the unlicensed spectrum and/or channels in a 5 GHz band of frequencies in the unlicensed spectrum. The 2.4 GHz band is often used more heavily for Wi-Fi transmissions than the 5 GHz band because the 2.4 GHz band can provide a wider coverage area and is supported by more legacy devices, although in many cases the 5 GHz band can provide higher data transfer speeds.

Channels in the 5 GHz band are generally considered as candidates for LAA transmissions to avoid the risk of interference with channels in the more heavily used 2.4 GHz band. Federal Communications Commission (FCC) rules may also prohibit using 2.4 GHz channels for LAA transmissions. However, even though the 5 GHz band may be used less heavily on average and 5 GHz channels may be the only candidates for LAA transmissions, there remains a risk of LAA transmissions in the 5 GHz band interfering with Wi-Fi transmissions in the 5 GHz band. Accordingly, operators of wireless telecommunication networks have often avoided enabling LAA or deploying LAA-capable hardware due to concerns about LAA transmissions interfering with Wi-Fi transmissions.

Described herein are systems and methods that can use crowd-sourced data to identify geographical areas where utilization of one or more channels in the unlicensed spectrum is low enough that it is unlikely that LAA transmissions over those channels in those geographical areas would interfere with Wi-Fi transmissions. Accordingly, network operators can enable LAA transmissions using one or more channels of the unlicensed spectrum within the identified geographical areas to increase bandwidth during LTE communications, for instance by deploying LAA-compatible network hardware in the identified geographical areas or by permitting existing LAA-compatible network hardware and/or UEs to use LAA over channels of the unlicensed spectrum within the identified geographical areas.

Example Environments

FIG. 1 depicts an example environment in which user equipment (UE) 102 can connect to base stations 104 of a telecommunication network 106 in order to make or receive calls, transmit or receive messages and/or other data, and/or perform any other network operation. A UE 102 can be a mobile phone such as a smart phone or other cellular phone, a personal digital assistant (PDA), a personal computer (PC) such as a laptop, desktop, or workstation, a media player, a tablet, a gaming device, a smart watch, a hotspot, or any other type of computing or communication device. Example architecture for a UE 102 is illustrated in greater detail in FIG. 15, and is described in detail below with reference to that figure.

A UE 102 can wirelessly connect to a base station 104. The base station 104 can be an evolved Node B (eNB) or other type of access point that is linked to a core network of the telecommunication network 106. The core network can also be connected to other networks, such as an IP Multimedia Subsystem (IMS) and/or the Internet. UEs 102, base stations 104, and/or other elements of the telecommunication network 106 can be compatible with one or more wireless access technologies or protocols, such as fifth generation (5G) technologies, Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, and/or any other previous or future generation of wireless access technology.

For example, the telecommunication network 106 can be, or include, an LTE network. A core network of an LTE network can be referred to as an Evolved Packet Core (EPC), and an LTE base station 104 can be an eNB. Multiple eNBs can be part of a radio access network known as an Evolved Universal Mobile Telecommunications System (UMTS) Terrestrial Radio Access Network (E-UTRAN), through which UEs 102 can access the EPC of the LTE network.

Transmissions between a UE 102 and a base station 104 can occur wirelessly over channels in a licensed spectrum 108 of frequencies. For example, an operator of the telecommunication network 106 may have licensed one or more specific bands of frequencies to be used as dedicated frequencies for LTE transmissions between UEs 102 and base stations 104. Often, frequencies for LTE communications include frequencies within licensed bands in a range from 600 MHz to 2600 MHz, or other licensed bands. However, Licensed Assisted Access (LAA) can also allow LTE transmissions between a UE 102 and a base station 104 to at least partially occur over channels in an unlicensed spectrum 110 of frequencies that have not been licensed by entities.

In some examples, carrier aggregation (CA) techniques can be used to send LTE transmissions between a UE 102 and a base station 104 over multiple channels at different frequencies to increase the total bandwidth. While CA can be used to send LTE transmissions over multiple channels within the licensed spectrum 108, CA can also be used to send LTE transmissions over one or more channels in the licensed spectrum 108 as well as one or more channels in the unlicensed spectrum 110 using LAA. Accordingly, using LAA to transmit data between a UE 102 and a base station 104 over frequencies in the unlicensed spectrum 110 can supplement LTE transmissions in the licensed spectrum 108, thereby increasing the total available bandwidth and improving data transfer speeds.

Frequencies in the unlicensed spectrum 110 include frequencies often used for Wi-Fi transmissions between Wi-Fi access points 112 and UEs 102 or other types of computing devices 114. Other computing devices 114 can include computers, tablets, gaming consoles, smart devices, and/or other equipment that may be configured to wirelessly transmit data via Wi-Fi but that may or may not be configured to connect to base stations 104 of the telecommunication network 106. Various Wi-Fi standards use channels in a 2.4 GHz band and/or a 5 GHz band of the unlicensed spectrum 110. For example, Wi-Fi transmissions using 802.11b, 802.11g, and 802.11n standards can use channels in the 2.4 GHz band, while Wi-Fi transmissions using 802.11a, 802.11ac, and 802.11n standards can use channels in the 5 GHz band.

Because LAA transmissions and Wi-Fi transmissions can use the same or similar frequencies in the unlicensed spectrum 110, in some cases LAA transmissions between a UE 102 and a base station 104 may cause interference 116 with Wi-Fi transmissions between Wi-Fi access points 112 and UEs 102 or other computing devices 114, as shown in FIG. 1. Although the 2.4 GHz band and/or the 5 GHz band can be used for Wi-Fi transmissions depending on the Wi-Fi standards being used, the 2.4 GHz band is often more crowded. Accordingly, due to FCC rules and/or to lower the risk of interference 116 between LAA transmissions and Wi-Fi transmissions in the heavily used 2.4 GHz band, LAA transmissions often use channels in the 5 GHz band of the unlicensed spectrum 110.

In some examples, certain channels within four Unlicensed National Information Infrastructure (U-NII) bands within the 5 GHz band of the unlicensed spectrum 110 can be considered as candidates for potentially carrying LAA transmissions. These include channels in the U-NII-1 band (channels 36, 40, 44, and 48, centered at frequencies ranging from 5180 MHz to 5240 MHz), channels in the U-NII-2A band (channels 52, 56, 60, and 64, centered at frequencies ranging from 5260 MHz to 5320 MHz), channels in the U-NII-2C band (channels 100, 104, 108, 112, 116, 120, 124, 128, 132, 136, 140, and 144, centered at frequencies ranging from 5500 MHz to 5720 MHz), and channels in the U-NII-3 band (channels 149, 153, 157, 161, and 165, centered at frequencies ranging from 5745 MHz to 5825 MHz). Each individual channel in the U-NII bands can have a 20 MHz bandwidth, such that in this example the 25 candidate channels in the U-NII-1, U-NII-2A, U-NII-2C, and U-NII-3 bands have a total bandwidth of 500 MHz.

Although the 5 GHz band may often be less crowded than the 2.4 GHz band, the risk of interference 116 between LAA transmissions and Wi-Fi transmissions in the 5 GHz band of the unlicensed spectrum 110 can remain a concern, especially in geographical areas where use of the 5 GHz band for Wi-Fi transmissions is heavier than average. However, as will be described further below, the telecommunication network 106 can instruct multiple UEs 102 to report information about Wi-Fi signals they have detected to a server 118 or other computing device associated with the telecommunication network 106. Example architecture for the server 118 is illustrated in greater detail in FIG. 16, and is described in detail below with reference to that figure.

Figure 2:
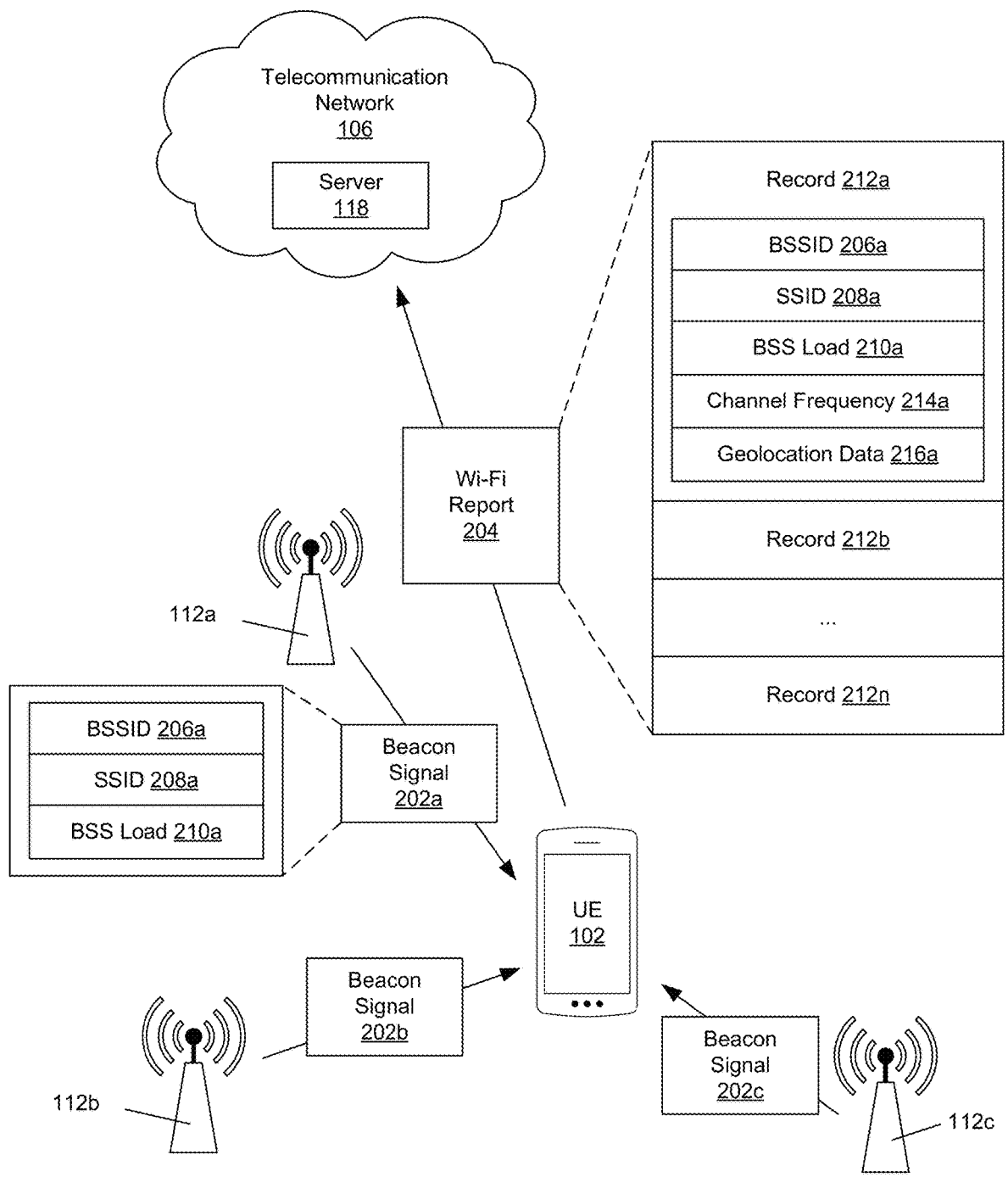
FIG. 2 depicts a UE collecting data from beacon signals broadcasted by Wi-Fi access points and submitting a Wi-Fi report to a server.

FIG. 2 depicts a UE 102 collecting data from beacon signals 202 broadcasted by Wi-Fi access points 112 and submitting a Wi-Fi report 204 to a server 118 or other computing device associated with a telecommunication network 106. A server 118 can receive numerous Wi-Fi reports 204 from UEs 102, and the server 118 can use this crowdsourced data to identify when and where the likelihood of interference 116 between LAA transmissions and Wi-Fi transmissions over one or more channels in the 5 GHz band is low enough that 5 GHz channels can be considered LAA-safe. Accordingly, the server's analysis of crowdsourced Wi-Fi reports 204 can estimate the gain LAA transmissions could provide and/or allow the operator of the telecommunication network 106 to deploy LAA-capable hardware in geographical areas where channels are determined to be LAA-safe. Deployed LAA-capable base stations 104 can then periodically monitor utilization of unlicensed channels, and use selected channels found to have low utilizations for LAA transmissions. Available bandwidth and/or data transfer speeds between UEs 102 and base stations 104 can therefore be improved when LAA-safe channels can be identified that have a low risk of interference 116 with Wi-Fi transmissions and LAA-capable hardware can be deployed in response.

A Wi-Fi access point 112 can be a Wi-Fi router or other access point. The Wi-Fi access point 112 can operate a Wi-Fi network that is available to UEs 102 and other computing devices 114 over a channel of the unlicensed spectrum 110. In some cases, a Wi-Fi access point 112 may offer multiple Wi-Fi networks, such as a first Wi-Fi network that uses a channel in the 2.4 GHz band and a second Wi-Fi network that uses a channel in the 5 GHz band such that devices can connect to either Wi-Fi network using the 2.4 GHz channel or the 5 GHz channel.

A Wi-Fi access point 112 can broadcast a beacon signal 202 that includes information about a Wi-Fi network provided by the Wi-Fi access point 112. For example, for a particular Wi-Fi network that uses a channel in the 5 GHz band, the Wi-Fi access point 112 can broadcast a beacon signal 202 over frequencies associated with that 5 GHz channel. UEs 102 and other computing devices 114 can be configured to scan through frequencies looking for beacon signals 202 so that they can identify Wi-Fi networks that are available at their current location, automatically connect to known Wi-Fi networks, and/or display options to users about available Wi-Fi networks.

A beacon signal 202 can be a frame that includes multiple types of data, including a Basic Service Set Identifier (BSSID) 206, a Service Set Identifier (SSID) 208, a Basic Service Set (BSS) Load 210 element, and/or other information about a Wi-Fi network provided by the Wi-Fi access point 112. The BSSID 206 can be an identifier for the Wi-Fi access point 112, such as a media access control (MAC) address. An SSID 208 can also be identifier associated with the Wi-Fi access point 112, such as a text string that can be used as a name for the Wi-Fi network operated by the Wi-Fi access point 112.

A BSS Load 210 element in a beacon signal 202 can include information about the Wi-Fi access point's current load, such as a station count identifying how many devices are connected to the Wi-Fi access point 112, a channel utilization value identifying a percentage of time that the Wi-Fi access point 112 sensed that the medium for its channel was busy, and an available admission capacity indicating a remaining amount of medium time available via explicit admission control. In some examples, the BSS Load 210 can be expressed in five bytes of a BSSLOAD element or a Quality of Service BSS (QBSS) Load element of a beacon signal 202, for instance as used in 802.11e standards. In these examples, within these five bytes of the BSS Load 210 element, the first and second bytes can be the station count value, the third byte can be the channel utilization value, and the fourth and fifth bytes can be the available admission capacity value. Accordingly, in these examples the middle byte of these five bytes of the BSS Load 210 element can be the channel utilization value. In other examples, a beacon signal 202 may express a channel utilization value in one or more other bytes of a BSS Load 210 element, or in another format or field apart from a BSS Load 210 element.

The server 118, or another element of the telecommunication network 106, can cause UEs 102 to scan for beacon signals 202 from Wi-Fi access points 112 at regular or varying intervals, log information about available Wi-Fi networks discovered by the UEs 102, and submit the logged information to the server 118 in Wi-Fi reports 204. A Wi-Fi report 204 from a UE 102 can include one or more records 212.

Each record 212 in a Wi-Fi report 204 can correspond to an individual Wi-Fi network discovered by the UE 102 based on a beacon signal 202 received by the UE 102 during a scan. A record 212 about a particular Wi-Fi network can contain information extracted from the beacon signal 202 for that Wi-Fi network, including its BSSID 206, SSID 208, and/or BSS Load 210. The record 212 can also include other information determined by the UE 102 about the Wi-Fi network, including a channel frequency 214 and geolocation data 216. The channel frequency 214 can indicate a frequency of a channel used by the Wi-Fi network, such as a frequency at which the beacon signal 202 was found during the UE's scan. The geolocation data 216 can indicate coordinates of the UE 102 when it received the beacon signal 202. The geolocation data 216 can be determined by Global Positioning System (GPS) functionality of the UE 102, cell tower triangulation, Wi-Fi crowdsourcing, or by any other geolocation technique. In some examples, the geolocation data 216 can also include an indicator of how precise the coordinates are estimated to be. A record 212 may also include any other type of information about a Wi-Fi network, including a timestamp at which a beacon signal 202 was received, a received signal strength value associated with the Wi-Fi network, and/or any other data about the Wi-Fi network derived from the beacon signal 202 and/or determined by the UE 102.

In some examples, the telecommunication network 106 can provide UEs 102 with a Wi-Fi scanning application that runs on the UE 102 to automatically scan for beacon signals 202 and submit Wi-Fi reports 204 as described above. For example, the telecommunication network 106 can use over-the-air updates or other distribution methods to provide UEs 102 with a Wi-Fi scanning application that runs automatically in the background on the UEs 102 to scan for beacon signals 202 and submit the Wi-Fi reports 204. In other examples, the telecommunication network 106 can provide firmware or operating system updates to UEs 102 that cause the UEs 102 to scan for beacon signals 202 and submit Wi-Fi reports 204, or otherwise send instructions to UEs 102 that cause existing hardware and/or software components of the UEs 102 to scan for beacon signals 202 and submit Wi-Fi reports 204.

In some examples, the telecommunication network 106 can cause UEs 102 to scan for beacon signals 202 at designated intervals, such as once an hour. The telecommunication network 106 can also cause UEs 102 to submit Wi-Fi reports 204 at the same or different designated intervals, and/or on demand. For example, a telecommunication network 106 can instruct UEs 102 to, once an hour, perform a scan for beacon signals 202 and submit a Wi-Fi report 204 that contains records 212 for all Wi-Fi networks found during that scan. As another example, a telecommunication network 106 can instruct UEs 102 to scan for beacon signals 202 once an hour, but submit a Wi-Fi report 204 once a day that contains records 212 for all Wi-Fi networks found during multiple scans performed throughout that day.

In some examples, the telecommunication network 106 can instruct UEs 102 to only scan for beacon signals 202 and/or send Wi-Fi reports 204 when the UEs 102 are in an active state and are not asleep or in a power-saving idle mode. Accordingly, battery life of the UEs 102 can be conserved by not waking UEs 102 specifically to scan for beacon signals 202 or to send Wi-Fi reports 204. Additionally, because UEs 102 are generally configured to already scan for beacon signals 202 to find available Wi-Fi networks while the UEs 102 are active, scanning for beacon signals 202 in order to log Wi-Fi data and compile Wi-Fi reports 204 as described herein may have a minimal impact on battery life of the UEs 102.

The server 118 can receive crowd-sourced Wi-Fi reports 204 when the telecommunication network 106 causes large numbers of UEs 102 to individually scan for beacon signals 202 and submit Wi-Fi reports 204. For example, a telecommunication network 106 can provide a Wi-Fi scanning application to some or all of the UEs 102 associated with subscribers to its services, such that thousands or even millions of UEs 102 can submit Wi-Fi reports 204 to the server 118. Although an operator of a telecommunication network 106 can also hire individuals to perform conventional "drive tests" in which they drive or walk around areas with UEs 102 to scan for beacon signals 202 and collect Wi-Fi data, crowd-sourcing the collection of Wi-Fi reports 204 as described above can provide the server 118 with Wi-Fi data associated with large geographical areas very quickly. For example, in some configurations two million UEs 102 can submit Wi-Fi reports 204 that in the aggregate contain 450 million individual records 212 in a single day. As another example, in a single day 40,000 UEs 102 in New York County can submit Wi-Fi reports 204 that in the aggregate contain nine million individual records 212 having geolocation data 216 for locations spread across substantially the entirety of New York County.

Figure 3:
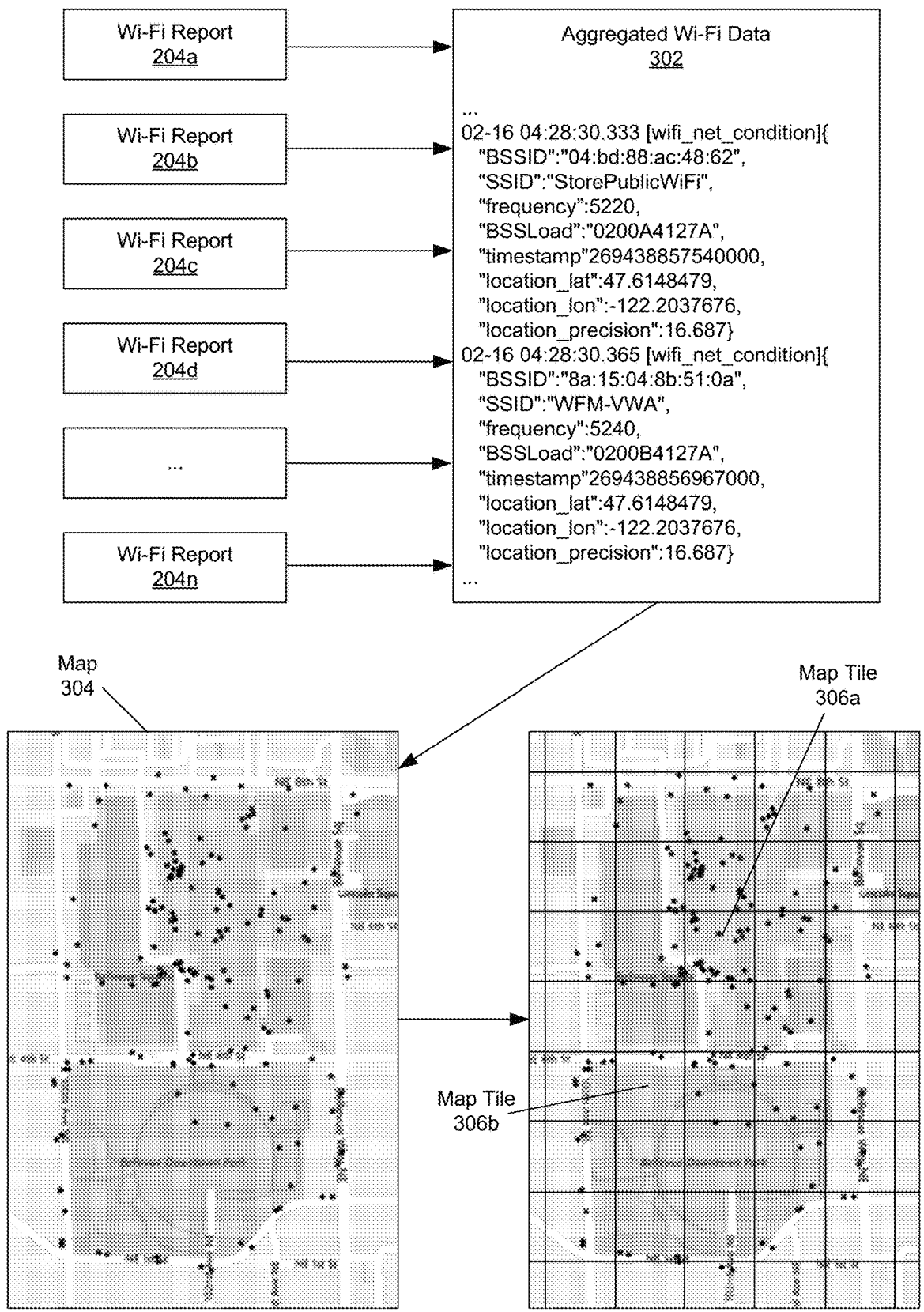
FIG. 3 depicts an example of aggregated Wi-Fi data that a server can generate by compiling individual crowd-sourced Wi-Fi reports received from UEs.

FIG. 3 depicts an example of aggregated Wi-Fi data 302 that the server 118 can generate by compiling individual crowd-sourced Wi-Fi reports 204 received from UEs 102. In some examples, the server 118 can generate aggregated Wi-Fi data 302 based on a set of Wi-Fi reports 204 that are received over a period of time from multiple UEs 102, such as by combining Wi-Fi reports 204 received over a period of five days or any other period of time. In some examples, geolocation data 216, timestamps, or other data in submitted Wi-Fi reports 204 can be used to filter or search for records 212 corresponding to desired criteria so that aggregated Wi-Fi data 302 can be generated that contain records 212 specific to the desired criteria. In other examples, master aggregated Wi-Fi data 302 can be generated from submitted Wi-Fi reports 204, and the master aggregated Wi-Fi data 302 can later be filtered or searched to find records 212 that have desired criteria. For example, the server 118 can generate a set of aggregated Wi-Fi data 302 that contains records 212 for a desired geographical area, such as within a particular county, city, or neighborhood, or search a previously generated master aggregated Wi-Fi data 302 for records 212 corresponding to that desired geographical area.

As shown in FIG. 3, in some examples the server 118 can also use geolocation data 216 to plot the positions of individual records 212 from aggregated Wi-Fi data 302 on a map 304. The map 304 can be divided into a plurality of map tiles 306, such that individual records 212 from aggregated Wi-Fi data 302 can be plotted within corresponding map tiles 306. In some embodiments, the map tiles 306 can correspond to 100 meter by 100 meter areas of the map 304, although in other embodiments the map tiles 306 can have any other dimensions. While FIG. 3 shows records 212 plotted onto a map 304 and to individual map tiles 306, in some examples the server 118 may identify a set of records 212 that have geolocation data 216 within one or more specific map tiles 306 without visually plotting them on a map 304.

After compiling aggregated Wi-Fi data 302 based on crowd-sourced Wi-Fi reports 204, the server 118 can analyze the aggregated Wi-Fi data 302 for a particular geographical area so that it can be determined whether LAA transmissions should be permitted in that particular geographical area, and if so on what channels and/or how much bandwidth gain could be provided by LAA transmissions. In some examples, these determinations can be made based on identifying channels in the 5 GHz band of the unlicensed spectrum 110 that are not being used by Wi-Fi access points 112 in the geographical area, as discussed below with respect to FIGS. 4-6. In other examples, these determinations can be made based on identifying channels in the 5 GHz band of the unlicensed spectrum 110 that are being used by Wi-Fi access points 112 in the geographical area but have utilization levels that are lower than a threshold value, as discussed below with respect to FIGS. 7-14.

Figure 4:
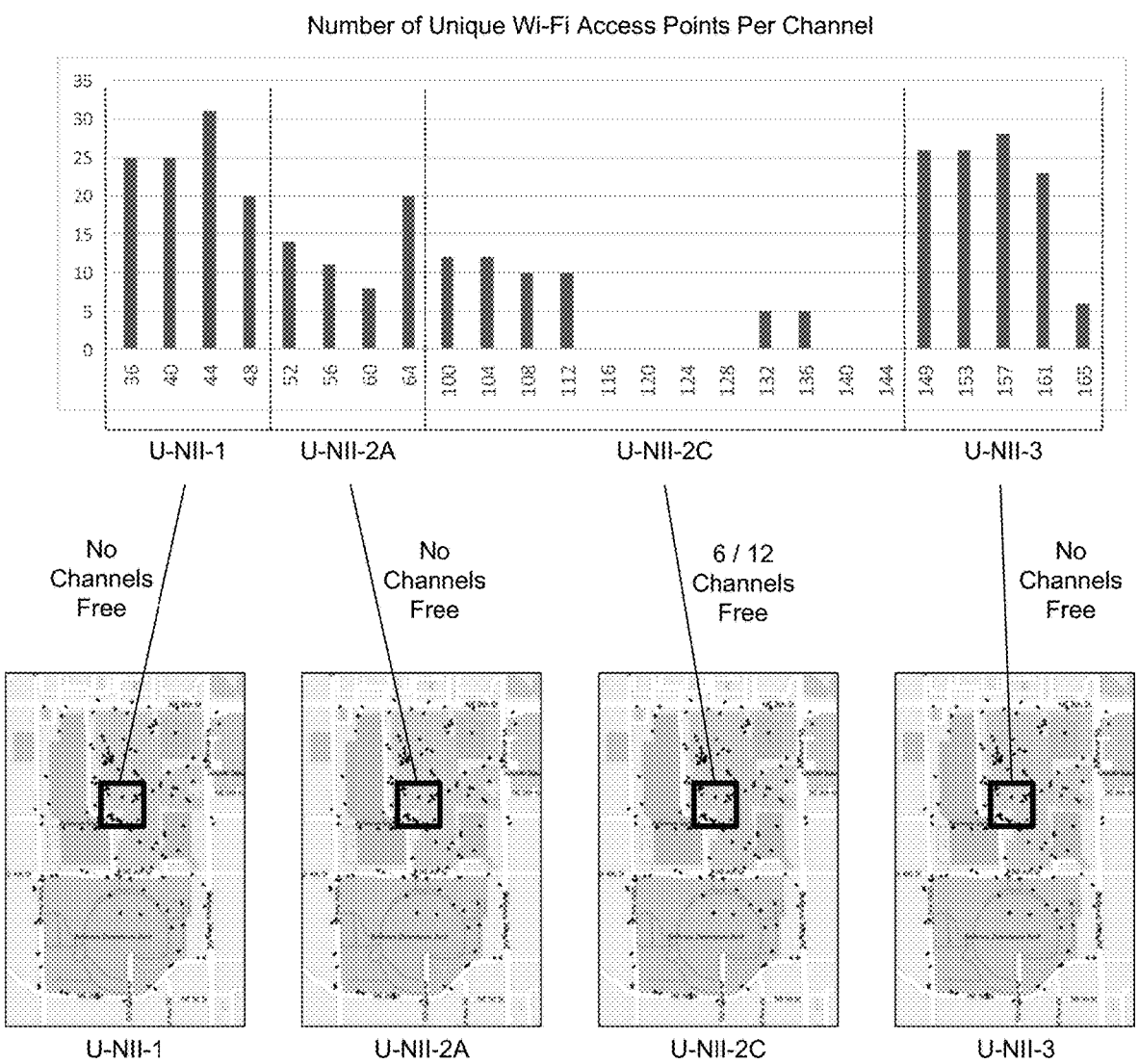
FIG. 4 depicts an example chart generated by a server from sample Wi-Fi reports that shows a number of unique Wi-Fi access points per channel of four 5 GHz bands with respect to a single map tile.
Figure 5A:
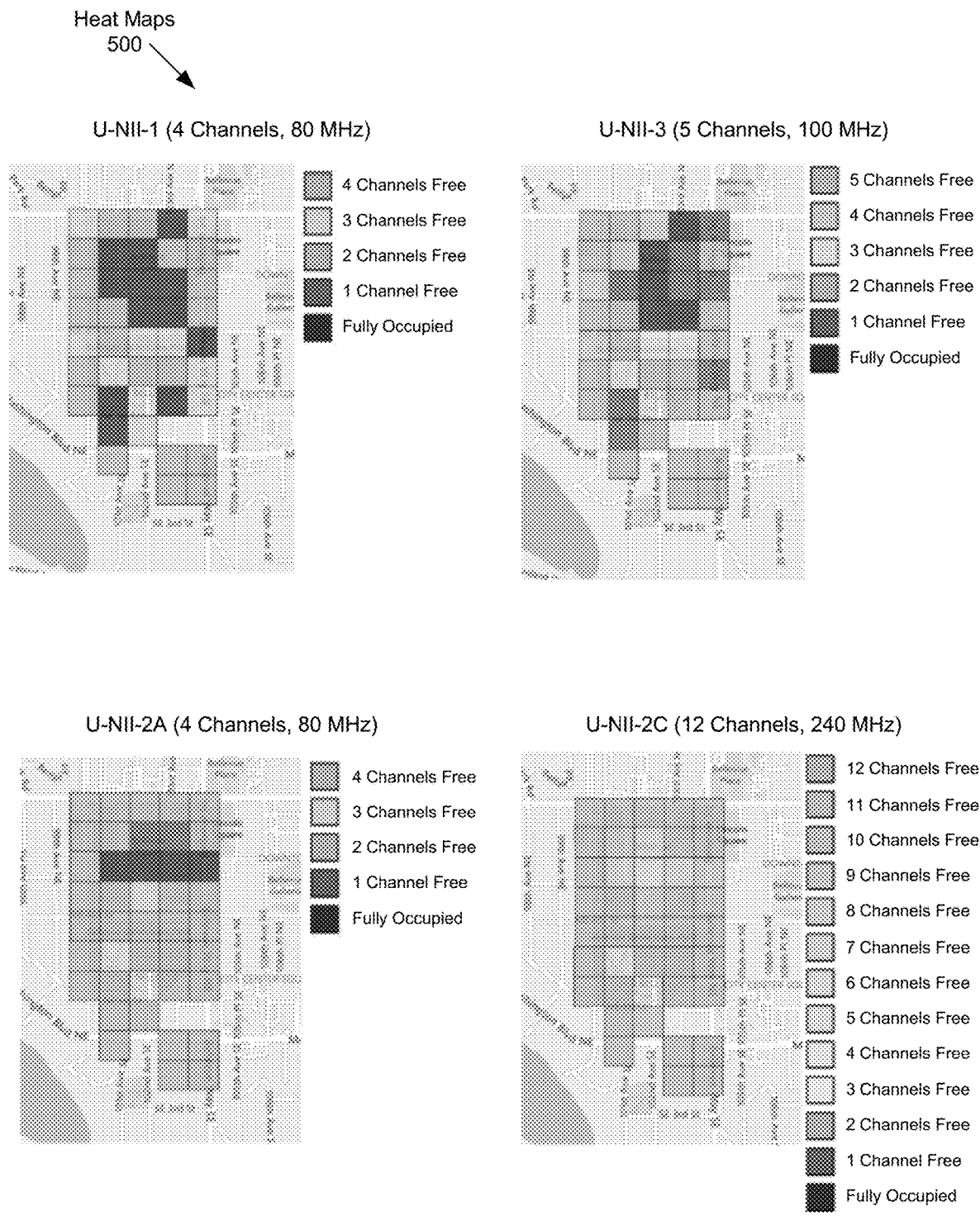
FIGS. 5A and 5B depict example heat maps that indicate how many channels are free in one or more bands of the unlicensed spectrum.
Figure 5B:
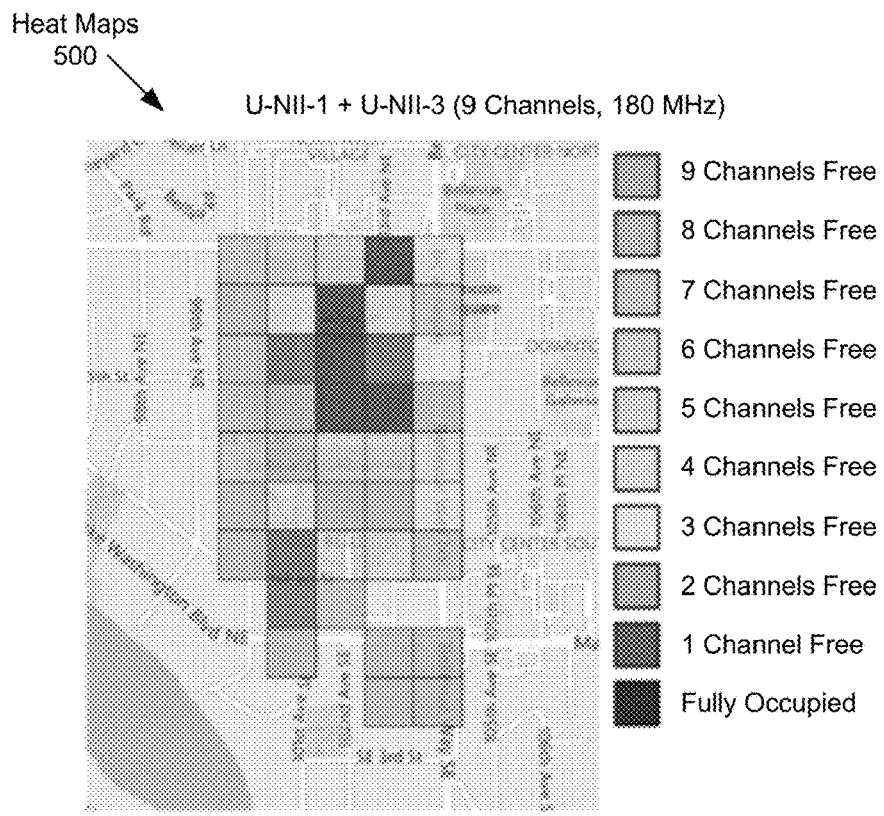
Figure 5B:
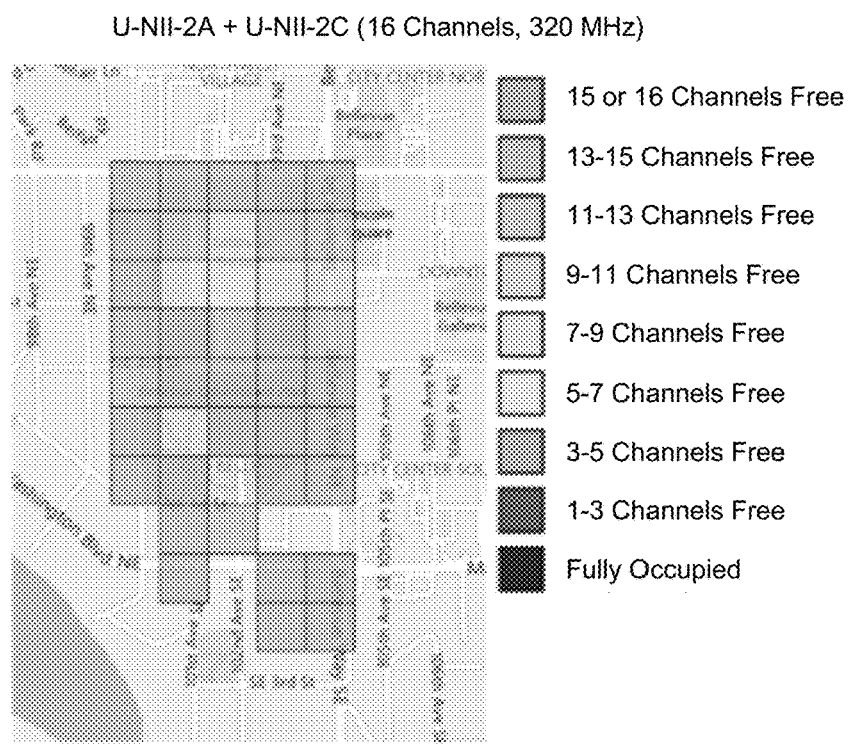
Figure 6:
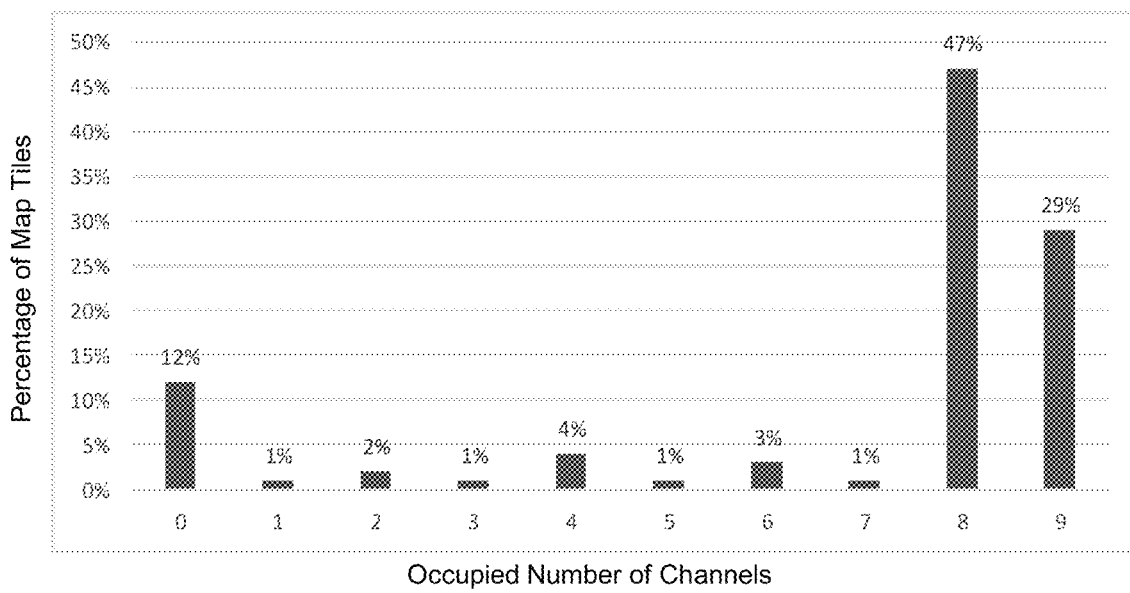
FIG. 6 depicts two example charts showing a percentage of map tiles spanning New York County that had, in sample data, each possible number of channels occupied in different combinations of bands.
Figure 6:
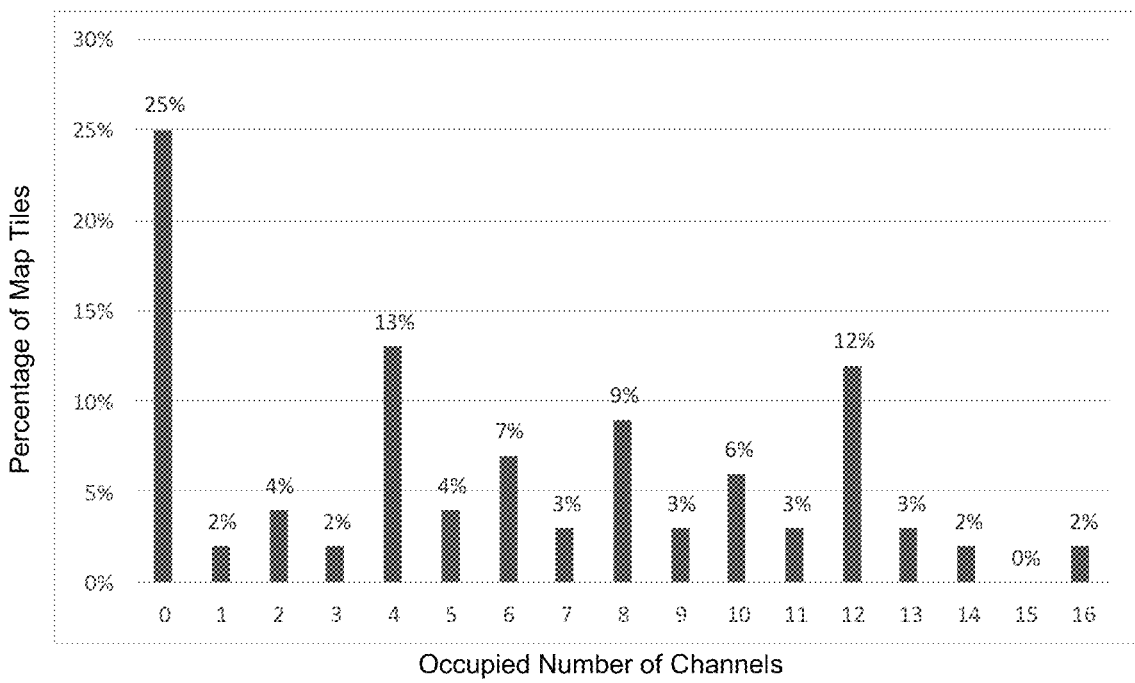

FIGS. 4-6 depict charts and maps that can be created by a server 118 to help determine whether channels in the 5 GHz band of the unlicensed spectrum 110 are not being used by Wi-Fi access points 112 in a geographical area. To determine if any channels in the 5 GHz band of the unlicensed spectrum 110 are not being used by Wi-Fi access points 112 in a particular geographical area, the server 118 can first identify a set of records 212 from aggregated Wi-Fi data 302 that have geolocation data 216 corresponding to positions within map tiles 306 that cover the geographical area.

Within records 212 associated with the same map tile 306, there may be numerous records 212 about a single Wi-Fi access point 112. For example, multiple UEs 102 may have received beacon signals 202 from the same Wi-Fi access point 112 and included data about that Wi-Fi access point 112 in their Wi-Fi reports 204. As another example, a single UE 102 may have included multiple records 212 about the same Wi-Fi access point 112 in its Wi-Fi reports 204, for instance if the UE 102 did not move between hourly scans for beacon signals 202. However, from numerous records 212 corresponding to an individual map tile 306 in the geographical area, the server 118 can identify unique Wi-Fi access points 112 based on BSSIDs 206, SSIDs 208, and/or other data. The server 118 can also identify channels used by those unique Wi-Fi access points 112 by finding channels that map to the channel frequencies 214 used by the Wi-Fi access points 112 as reported in the records 212. For example, a record 212 in the aggregated Wi-Fi report 302 indicating that a UE 102 received a particular beacon signal 202 from a particular Wi-Fi access point 112 at a channel frequency 214 of 5220 MHz can indicate that that the particular Wi-Fi access point 112 was using channel 44 (centered at 5220 MHz).

After identifying unique Wi-Fi access points 112 in a map tile 306 and the channels used by those unique Wi-Fi access points 112, the server 118 can count the number of unique Wi-Fi access points 112 that use each channel of the unlicensed spectrum 110. In some examples, these counts of unique Wi-Fi access points 112 per channel can be illustrated on a chart. For example, FIG. 4 depicts a chart generated by the server 118 from sample Wi-Fi reports 204 that shows a number of unique Wi-Fi access points 112 per channel of four 5 GHz U-NII bands with respect to a particular map tile 306. In the example of FIG. 4, the records 212 for a particular map tile 306 may indicate that all of the channels in the U-NII-1, U-NII-2A, and U-NII-3 bands are being used by at least one Wi-Fi access point 112 within the map tile 306, but only 50% of the channels in the U-NII-2C band are being used by any Wi-Fi access points 112 in the map tile 306. Accordingly, the example chart of FIG. 4 shows that six of the twelve channels in the U-NII-2C band are free.

Although FIG. 4 depicts an example in which the server 118 counts the number of unique Wi-Fi access points 112 per channel using records corresponding to a single map tile 306, the server 118 can repeat this process for multiple map tiles 306 in a certain geographical area and find the number of unique Wi-Fi access points 112 per channel with respect to each map tile 306. From these counts, the server 118 can also identify how many channels are free (i.e., not being used by any Wi-Fi access points 112) in each band.

As shown in the examples of FIGS. 5A and 5B, after using records 212 in aggregated Wi-Fi data 302 to identify how many channels are free in one or more bands within multiple map tiles 306 across a geographical area, the server 118 can generate heat maps 500 that indicate how many channels are free in those bands. Individual map tiles 306 can be colored, shaded, or otherwise marked in the heat maps 500 to express the number of channels that are free (i.e., not being used by any Wi-Fi access points 112) in one or more bands of the unlicensed spectrum 110. Alternately, or in addition, heat maps 500 can indicate a frequency values that correspond to the number of free channels in map tiles 306. For example, instead of indicating that a particular map tile 306 has two channels free in the U-MI-1 band, the heat map 500 could also, or in addition, indicate that the particular map tile 306 has a total of 40 MHz free in the U-NII-1 band, corresponding to a combination of the two 20 MHz frequency ranges used by each of the two free channels.

As an example, FIG. 5A shows heat maps 500 for each of four 5 GHz U-NII bands. In the example of FIG. 5A, the shading indicates that although many of the illustrated map tiles 306 in the pictured geographical area have few or no channels free in the U-NII-1 and U-NII-3 bands, more map tiles 306 have at least some channels free in the U-NII-2A band and all of the map tiles 306 have channels free in the U-NII-2C band. Heat maps 500 for multiple bands can also be combined as shown in the example of FIG. 5B, which indicates that although some map tiles 306 have no free channels in a combination of the U-NII-1 and U-NII-3 bands (nine total channels with an aggregate bandwidth of 180 MHz), all of the map tiles 306 have five or more free channels in a combination of the U-NII-2A and U-NII-2C bands (sixteen total channels with an aggregate bandwidth of 320 MHz).

Instead of, or in addition to, generating heat maps 500, the server 118 can also determine percentages of the total map tiles 306 in a geographical area that have distinct numbers of occupied channels within one or more bands. For example, FIG. 6 depicts two charts generated from sample aggregated Wi-Fi data 302 for New York County. The charts show a percentage of map tiles 306 spanning New York County that had, in the sample data, each possible number of channels occupied in a combination of the U-NII-1 and U-NII-3 bands and a combination of the U-NII-2A and U-NII-2C bands. For example, the first chart shows that sample aggregated Wi-Fi data 302 indicated that 12% of the map tiles 306 of New York County had all of the U-NII-1 and U-NII-3 channels free, while 29% of the map tiles 306 of New York County had all of the U-NII-1 and U-NII-3 channels occupied. The second chart shows that, from the same sample data, 25% of the map tiles 306 of New York County had all of the U-NII-2A and U-NII-2C channels free, while only 2% of the map tiles 306 of New York County had all of the U-NII-1 and U-NII-3 channels occupied. The second chart also shows that, when combining the percentages of map tiles 306, 60% of the map tiles 306 had seven or fewer of the U-NII-2A and U-NII-2C channels occupied (meaning that nine or more of those channels were free in 60% of the area of New York County).

If the underlying data shown in the charts and/or heat maps 500 discussed above with respect to FIGS. 4-6 indicate that channels in one or more specific bands are unlikely to interfere with Wi-Fi transmissions in a particular geographical area, those channels can be considered LAA-safe channels within that particular geographical area. For example, the heat maps 500 shown in FIG. 5A can show that one or more channels in the U-NII-2C band are likely to be free in the geographical area, while the heat maps 500 shown in FIG. 5B can show that one or more channels in a combination of the U-NII-2A and U-NII-2C bands are likely to be free in the geographical area. These example heat maps 500 show that channels in a combination of the U-NII-2A and U-NII-2C bands are relatively free compared to a combination of the channels in the U-NII-1 and U-NII-3 bands in this geographical area, and that the channels in the U-NII-2A and U-NII-2C bands would have relatively little risk of interfering with Wi-Fi signals in the mapped geographical area compared to using channels in the U-NII-1 and U-NII-3 bands.

In some examples, the server 118 can output charts, heat maps 500, and/or underlying data from the server's analysis for manual review to identify LAA-safe channels. For example, such charts, heat maps 500, and/or other underlying data can be displayed in a user interface or be printed out after they have been generated by the server 118. Such heat maps, charts, and/or other data indicating LAA-safe channels can be used to estimate bandwidth gain if those channels were used for LAA transmissions.

The server 118 can also be configured to directly determine from an analysis of the aggregated Wi-Fi data 302 that channels in a particular band, or a combination of bands, are safe to use for LAA transmissions in a geographical area. In some examples, the server 118 can be configured to determine that channels of one or more bands are LAA-safe when the total number of free channels, or a ratio of free channels to a total number of channels, exceeds a predefined threshold value on average across the map tiles 306 covering the geographical area. For example, the server 118 can use data corresponding to heat maps 500 to determine if the number of free channels in one or more bands exceeds one or more across the map tiles 306 covering a geographical area. In other examples, the server 118 can be configured to determine that channels of one or more bands are LAA-safe when the percentage of map tiles 306 having at least a predefined number of free channels exceeds a predefined percentage. For example, in the example of FIG. 6 in which nine or more channels of the U-NII-2A and U-NII-2C bands are free in 60% of the map tiles 306, if the predefined number of free channels is four and the predefined percentage is 50%, the server 118 can determine that the U-NII-2A and U-NII-2C channels are LAA-safe. The server 118 may provide a recommendation regarding deployment of LAA-compatible hardware based on this analysis, and/or provide an estimate of a bandwidth gain using such channels could provide if used for LAA transmissions.

After LAA-safe channels have been identified with respect to a geographical area by the server 118, or are identified based on a recommendation or other output generated by the server 118, those LAA-safe channels can be used for LAA transmissions in the geographical area. For example, an operator of the telecommunication network 106 can deploy LAA-capable base stations 104 in that geographical area that are configured to use identified LAA-safe channels for LAA transmissions. Alternately, or in addition, the server 118 or another element of the telecommunication network 106 can send instructions to existing LAA-capable base stations 104 and/or UEs 102 located within that geographical area that change settings to enable options to use LAA transmissions within that geographical area when appropriate.

In some examples, the server's analysis of aggregated Wi-Fi data 302 may indicate that certain channels are LAA-safe channels, but are not yet supported by UEs 102 or base stations 104. For example, some LAA-capable hardware, such as UEs 102 and/or base stations 104, may be natively configured to support potential use of the nine channels in the U-NII-1 and U-NII-3 bands for LAA transmissions, but not the sixteen channels in the U-NII-2A and U-NII-2C bands. However, as shown in the examples above with respect to FIG. 5B and FIG. 6, the server's analysis of aggregated Wi-Fi data 302 for a geographical area may show that the channels in the U-NII-2A and U-NII-2C bands are more likely to be free in the geographical area than the channels in the U-NII-1 and U-NII-3 bands. Accordingly, a network operator or manufacturers of the UEs 102 or base stations 104 may initiate upgrades of the UEs 102 or base stations 104 to also support LAA transmissions in the U-NII-2A and U-NII-2C bands, or manufacture new versions of UEs 102 or base stations 104 that support LAA transmissions in the U-NII-2A and U-NII-2C bands.

Although analysis discussed above with respect to FIGS. 4-6 can indicate when channels of one or more bands of the unlicensed spectrum 110 are LAA-safe with respect to one or more map tiles 306 because they are not being used by any Wi-Fi access points 112 in those map tiles 306, and accordingly reflect a potential bandwidth gain that LAA transmissions may provide, in some situations channels may be LAA-safe even when those channels are being used by Wi-Fi access points 112. For example, densely populated areas may have a large number of Wi-Fi access points 112 that in the aggregate have been set to use all of the candidate channels in the 5 GHz band. However, although the Wi-Fi access points 112 may be using all of the candidate channels to offer their Wi-Fi networks, actual utilization of those channels to send data via Wi-Fi transmissions may be low enough that LAA transmissions over those channels would not interfere with the Wi-Fi transmissions and the channels can be considered LAA-safe and bandwidth gain could be achieved using such LAA transmissions.

For example, if a particular channel is being utilized only 20% of the time for Wi-Fi transmissions, then that channel is free 80% of the time such that LAA transmissions on that channel would not interfere with Wi-Fi transmissions during that 80% of the time and bandwidth gain using such LAA transmissions could be achieved. Accordingly, as shown in FIGS. 7-14, the server 118 can use channel utilization information from records 212 in aggregated Wi-Fi data 302 to help determine when the actual utilization of channels of one or more 5 GHz bands is low enough in a geographical area to permit LAA transmissions over those channels in the geographical area.

Figures 7, 8:
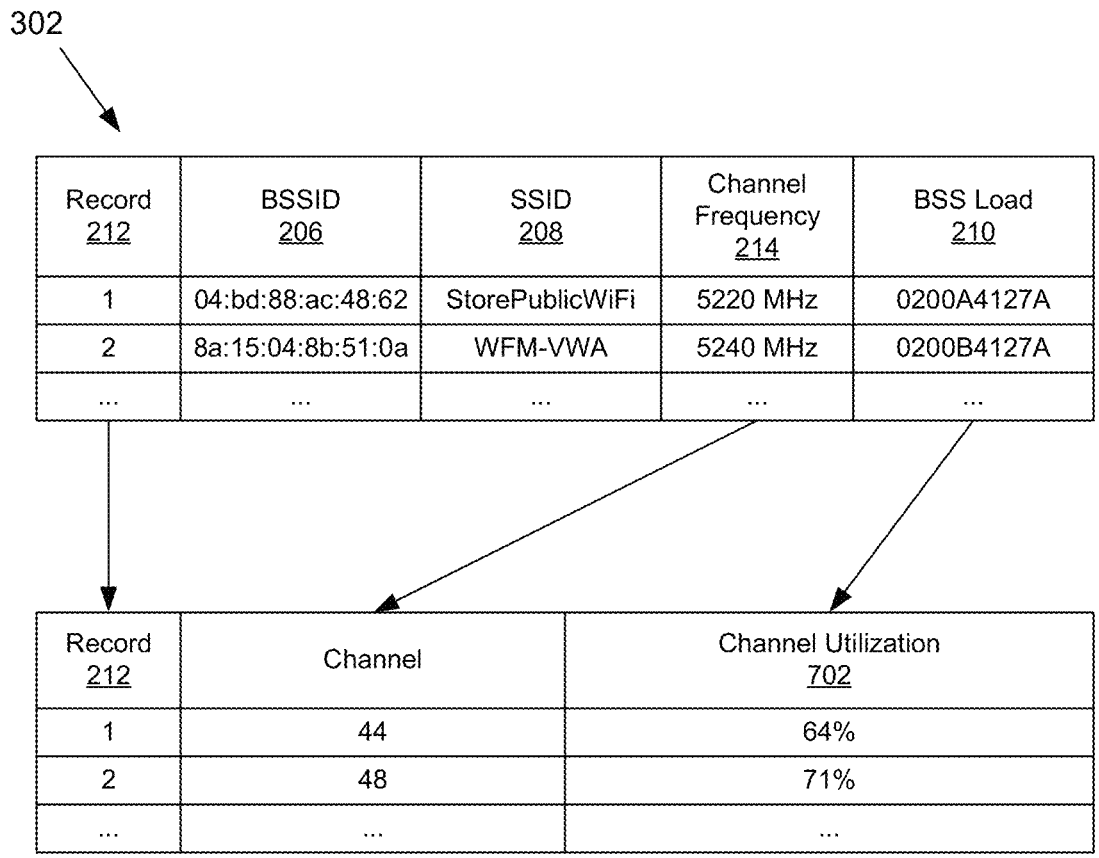
FIG. 7 depicts channel and channel utilization values being determined from records of aggregated Wi-Fi data.
FIG. 8 depicts average channel utilization values for individual channels with respect to a map tile.

As shown in FIG. 7, aggregated Wi-Fi data 302 can include numerous crowd-sourced records 212 submitted by UEs 102 in Wi-Fi reports 204. As discussed above, each record 212 can include identifiers associated with a specific Wi-Fi access point 112, such as BSSIDs 206 and/or SSIDs 208, but can also include channel frequency 214 and BSS Load 210 data. The server 118 can use a record's channel frequency 214 data to identify a channel used by the Wi-Fi access point 112. For example, when a record's channel frequency 214 is 5220 MHz, the server 118 can determine that the corresponding channel is channel 44 (centered at 5220 MHz) as shown in the example of FIG. 7.

The server 118 can also determine channel utilization 702 values associated with each record 212 in the aggregated Wi-Fi data 302. As discussed above, Wi-Fi access points 122 can include channel utilization information about a percentage of time that a Wi-Fi access point 112 sensed that the medium for its channel was busy within BSS Load 210 elements of beacon signals 202. When channel utilization information indicates that a channel used by a Wi-Fi access point 112 is busy for a certain percentage of the time, then the server 118 can determine that during the remainder of the time the channel is not being used for data transmissions by that Wi-Fi access point 112 and would therefore be free for LAA transmissions without the risk of interference 116. For example, when a Wi-Fi access point's channel utilization information indicates that a channel is busy 10% of the time, then during 90% of the time the channel is likely to be free such that LAA transmissions would not interfere with Wi-Fi transmissions associated with that Wi-Fi access point 112.

For example, a Wi-Fi access point's channel utilization information can be expressed in a middle byte of a five-byte section of a QBSS element in a beacon signal 202. A beacon signal's BSS Load 210 can be included in a record 212 of a Wi-Fi report 204, such that it becomes part of the aggregated Wi-Fi data 302. Accordingly, in this example the server 118 can extract the byte of a record's BSS Load 210 element that corresponds to the channel utilization information and convert it from hexadecimal to decimal form to get a value normalized on a scale from 0 to 255. The server 118 can then calculate a percentage for the channel utilization 702 based on dividing the decimal value by 255. For example, if the middle byte of a five-byte BSS Load 210 element is the hexadecimal value A4 (164 in decimal), the server 118 can determine that the channel utilization 702 is 64% (164/255), as shown in FIG. 7. In other examples, the server 118 can determine channel utilization 702 from other types of data, or receive channel utilization information in records 212 based on conversions performed by UEs 102. The server 118 can use the conversion processes described with respect to FIG. 7 to determine a channel and corresponding channel utilizations 702 for multiple individual records 212 having geolocation data 216 corresponding to a particular map tile 306.

As shown in FIG. 8, the server 118 can use the channel and channel utilization 702 information for multiple individual records 212 having geolocation data 216 corresponding to a particular map tile 306 to calculate an average channel utilization 802 within the map tile 306 for individual channels that are candidates for LAA transmissions, such as the channels of the four 5 GHz U-NII bands discussed above. In some examples, the server 118 can use timestamp data in the records 212 to calculate average channel utilization 802 values within a map tile 306 for different channels at different times of day. For example, this may show that the average channel utilization is higher in the map tile 306 for some or all channels during the middle of the day than at night. An example of time-based analysis of average channel utilization values is discussed in more detail below with respect to FIG. 14.

The server 118 can repeat the operations discussed above to determine an average channel utilization 802 for candidate channels in multiple map tiles 306, such as a set of map tiles 306 that cover the geographical area of a neighborhood, a city, a county, a state, or a country. The average channel utilization 802 for candidate channels in multiple map tiles 306 can be analyzed by the server 118 in one or more ways.

As a first example of the server's analysis, the server 118 can generate heat maps similar to those discussed above with respect to FIGS. 5A and 5B that indicate the average channel utilization 802 for one or more channels within individual map tiles 306 that span a particular geographical area. Such heat maps may indicate that a first set of one or more channels has a lower average channel utilization 802 across most of the map tiles 306 in the geographical area than a second set of one or more channels, thereby indicating that sending LAA transmissions using the first set of channels has a lower chance of interfering with Wi-Fi transmissions than LAA transmissions using the second set of channels in the geographical area.

Figure 9:
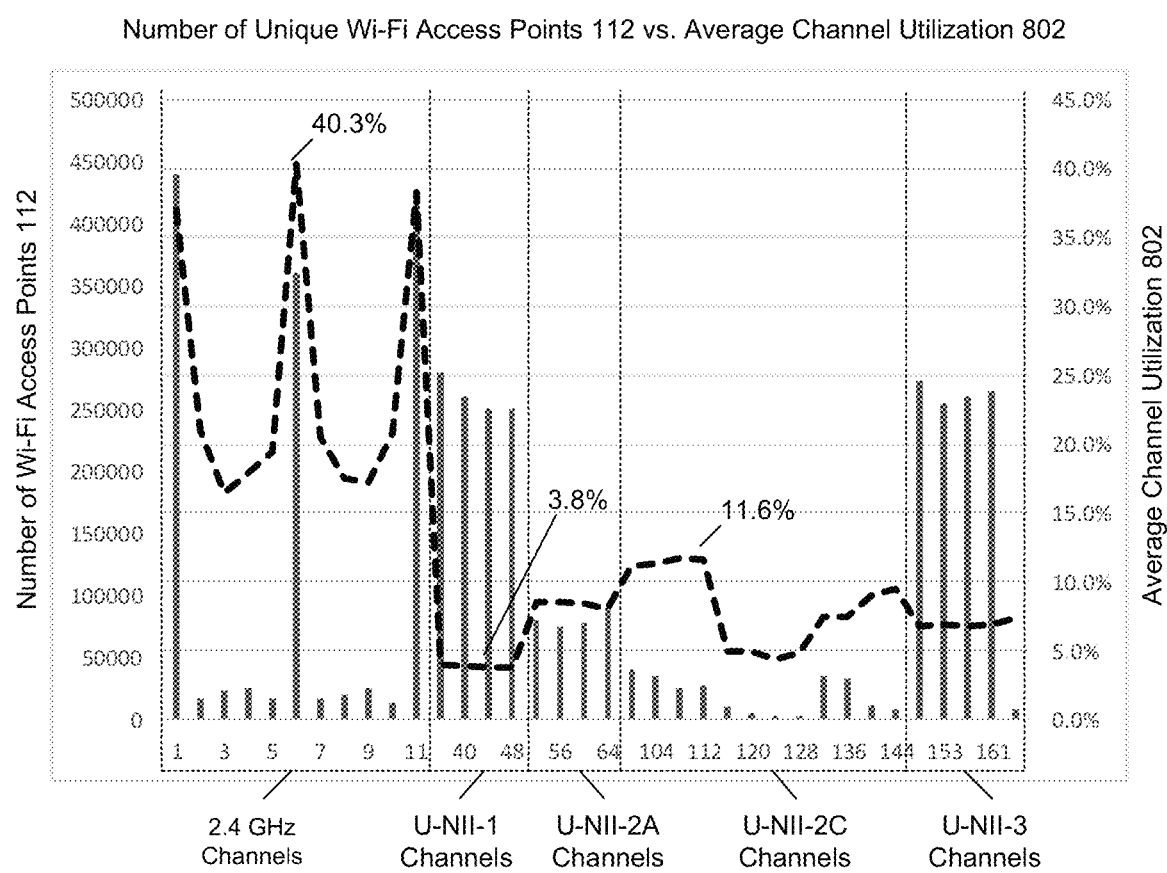
FIG. 9 depicts an example chart of average channel utilization values across a set of map tiles covering a geographical area with respect to multiple candidate channels for LAA transmissions.

As shown in the example of FIG. 9, the server 118 can also, or alternately, generate a chart that depicts the average channel utilization 802 across a set of map tiles 306 covering a geographical area with respect to multiple candidate channels for LAA transmissions. As shown in FIG. 9, the chart can also indicate a count of unique Wi-Fi access points 112 across the set of map tiles 306. In the example of FIG. 9, the chart shows that the average channel utilization 802 is relatively high in the normally-crowded 2.4 GHz band, for instance at around 40% for the most commonly used channels 1, 6, and 11. However, although large numbers of Wi-Fi access points 112 use channels in the 5 GHz band, especially in the U-NII-1 and U-NII-3 bands, those channels have average channel utilization 802 values that are much lower than in in the 2.4 GHz band. For example, the channels in the U-NII-1, U-NII-2A, and U-NII-3 bands (and most of the channels of the U-NII-2C band) have average channel utilization 802 values of under 10% even though relatively large numbers of Wi-Fi access points 112 are using those channels.

Accordingly, the server 118 can be set to determine that channels of one or more bands are LAA-safe in a set of map tiles 306 covering a geographical area when the average channel utilization 802 across the set of map tiles 306 is lower than a preset threshold value. For example, the server 118 can use data corresponding to heat maps of average channel utilizations 802 to determine that individual channels are LAA-safe when the average channel utilization 802 for the channels is lower than 10%.

Figure 10:
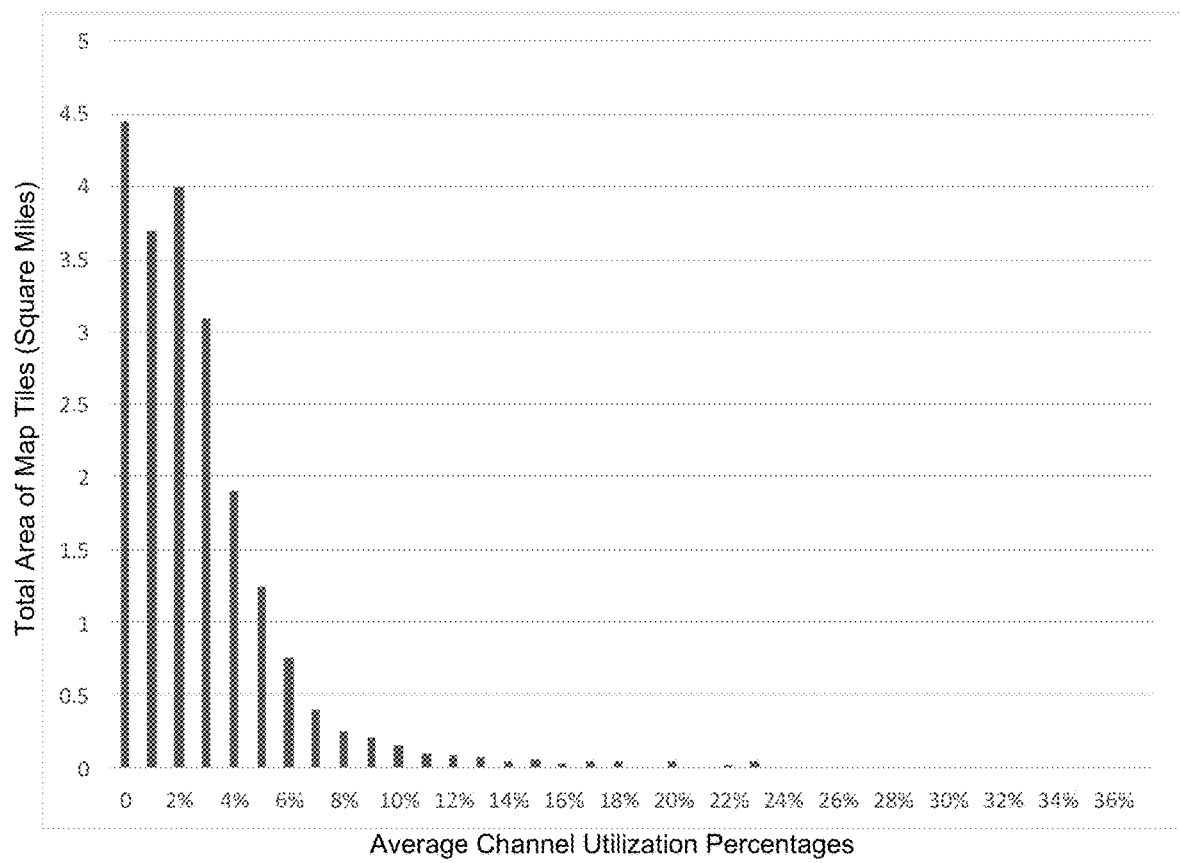
FIG. 10 depicts an example chart that indicates a total square mileage of aggregated map tiles that, in example data, each share the same average channel utilization value for a channel.

The server 118 can also, or alternately, determine sizes of total areas covered in the aggregate by multiple map tiles 306 that each share the same average channel utilization 802 value for a channel. For example, FIG. 10 depicts a chart generated by the server 118 from example aggregated Wi-Fi data 302 for map tiles 306 covering New York County, and indicates the total square mileage of aggregated map tiles 306 that each share the same average channel utilization 802 for 5 GHz channel 44 in the U-NII-1 band. As shown in FIG. 10, in this example, aggregated Wi-Fi data 302 for map tiles 306 that had a 2% average channel utilization 802 had an aggregated total area of four square miles, and the majority of the map tiles 306 covering the overall square mileage of New York County had average channel utilizations 802 of less than 10%.

In some examples, the server 118 can be set to determine that channels of one or more bands are LAA-safe in a set of map tiles 306 when the percentage or total aggregated size of map tiles 306 that have under a threshold average channel utilization value exceeds a threshold value. For example, in the example of FIG. 10, the server 118 can determine that channel 44 is an LAA-safe channel because the aggregated area of map tiles 306 with under a 10% average channel utilization 802 exceeds a threshold value.

While the server's analysis can identify when individual channels are LAA-safe as discussed above, in some examples UEs 102 and/or base stations 104 can be configured to use carrier aggregation (CA) to send LAA transmissions over multiple channels. For instance, the bandwidth available for LAA transmissions can be increased when CA is used to send data over three consecutive neighboring channels in a 5 GHz U-NII band. As shown in FIG. 10, in some cases one channel may have a relatively high average channel utilization 802, while neighboring channels may have lower average channel utilizations 802. Accordingly, the server 118 can also determine probabilities of when at least a threshold number of consecutive neighboring channels in a band are expected to be free and LAA-safe.

As an example, when the server 118 is set to determine the probability that three consecutive channels in the 5 GHz U-NII-1 band will be free, such that the three consecutive channels can be used for carrier aggregation when sending LAA transmissions, there are three possibilities for the three consecutive channels that could be free: a first set of channels that includes channels 36, 40, and 44, and a second set of channels that includes channels 40, 44, and 48. The server 118 can accordingly determine an average channel utilization 802 for each of those channels across one or more map tiles 306 as discussed above. Although average channel utilization 802 values for channels 36, 40, 44, and 48 are often much lower as shown in FIG. 9, for explanation purposes FIG. 11 depicts example data indicating that channel 36 has an average channel utilization 802 of 40%, channel 40 has an average channel utilization 802 of 50%, channel 44 has an average channel utilization 802 of 60%, and channel 48 has an average channel utilization 802 of 70%. Because the average channel utilization 802 values can correspond to an average amount of time the channels are in use, they can also indicate that the channels are likely to be free during the remainder of the time. Accordingly, the example average channel utilization 802 values shown in FIG. 11 can also indicate that channel 36 has a 60% chance of being free, channel 40 has a 50% chance of being free, channel 44 has 40% chance of being free, and channel 48 has a 30% chance of being free.

As shown in FIG. 11, the server 118 can use the average channel utilization 802 values for individual channels in a band to calculate a probability of each possible set of three consecutive channels being entirely free. For example, for a first possible set of three consecutive channels that includes channels 36, 40, and 44, the server can multiply the 60% chance that channel 36 will be free by the 50% chance that channel 40 will be free by the 40% chance that channel 44 will be free, to determine that there is a 12% chance of all three of channels 36, 40, and 44 being free. The server can repeat these calculations for the other possible set of three consecutive channels in the U-NII-1 band that includes channels 40, 44, and 48.

Also as shown in the example of FIG. 11, the server 118 can use the probabilities that all of channels in each possible set of three consecutive channels will be free to determine an overall probability that at least three consecutive channels will be free in the band. For example, when a combination of channels 36, 40, and 44 has a 12% chance of being free (and thereby a 88% chance of at least one of them being used), and a combination of channels 40, 44, and 48 has a 6% chance of being free (and thereby a 94% chance of at least one of them being used), the server 118 can multiply the chances of that at least one channel in each set will be in use and subtract the result from 1, to determine that there is a 17.28% chance that at least three consecutive channels in the U-NII-1 band (channels 36, 40, 44, and 48) will be free. The server 118 can repeat these calculations for channels in the other U-NII bands. In some examples, the server 118 can generate charts, heat maps, and/or other representations of the probabilities described above.

Although the example of FIG. 11 shows the server 118 finding that there is a 17.28% chance of three or more channels in the U-NII-1 band will be free, in many cases the aggregated Wi-Fi data 302 can show much higher chances of three or more channels in the U-NII-1 band being free. For example, although the calculations shown in FIG. 11 are based on example data in which the channels of the U-NII-1 band have average channel utilization 802 values ranging from 40% to 70%, in many cases those channels may be found to have lower average channel utilization 802 values, and thus higher chances of the channels being free. For example, FIG. 9 shows an example in which the channels of the U-NII-1 band have average channel utilization 802 values ranging from 3.8% to 4.0%. If a map tile 306 had those lower average channel utilization 802 values for channels 36, 40, 44, and 48, then the probabilities of the sets of three consecutive channels being free, and the overall probability of at least three consecutive channels being free in the U-NII-1 band, would be higher.

Figure 12:
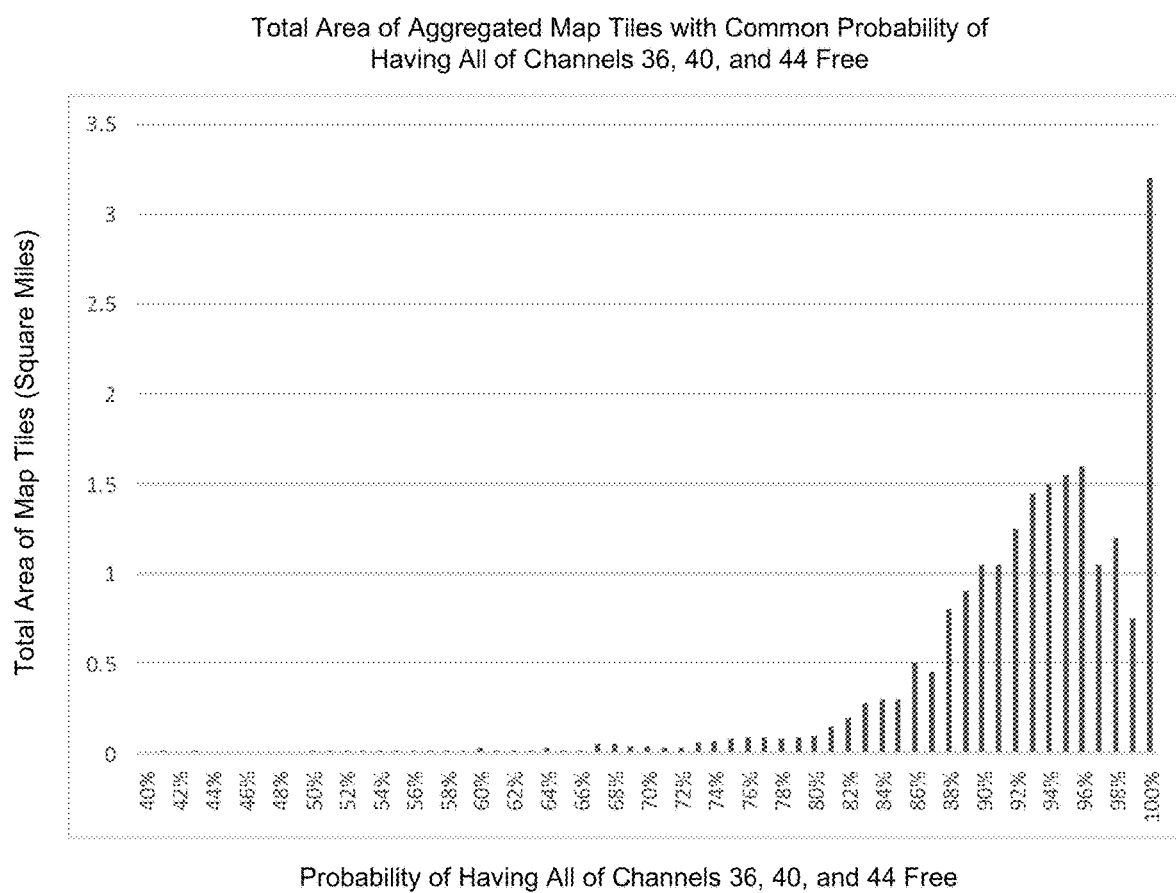
FIG. 12 depicts an example chart that indicates a total area of aggregated map tiles that, in example data, each share the same probability of having a set of three channels free in a particular band.

The server 118 can determine sizes of total areas covered in the aggregate by multiple map tiles 306 that each share the same probability of having a particular set of consecutive channels free. For example, FIG. 12 depicts a chart generated by the server 118 from example aggregated Wi-Fi data 302 for map tiles 306 covering New York County, and indicates the total square mileage of aggregated map tiles 306 that each share the same probability of having channels 36, 40, and 44 free in the U-NII-1 band.

Figure 13:
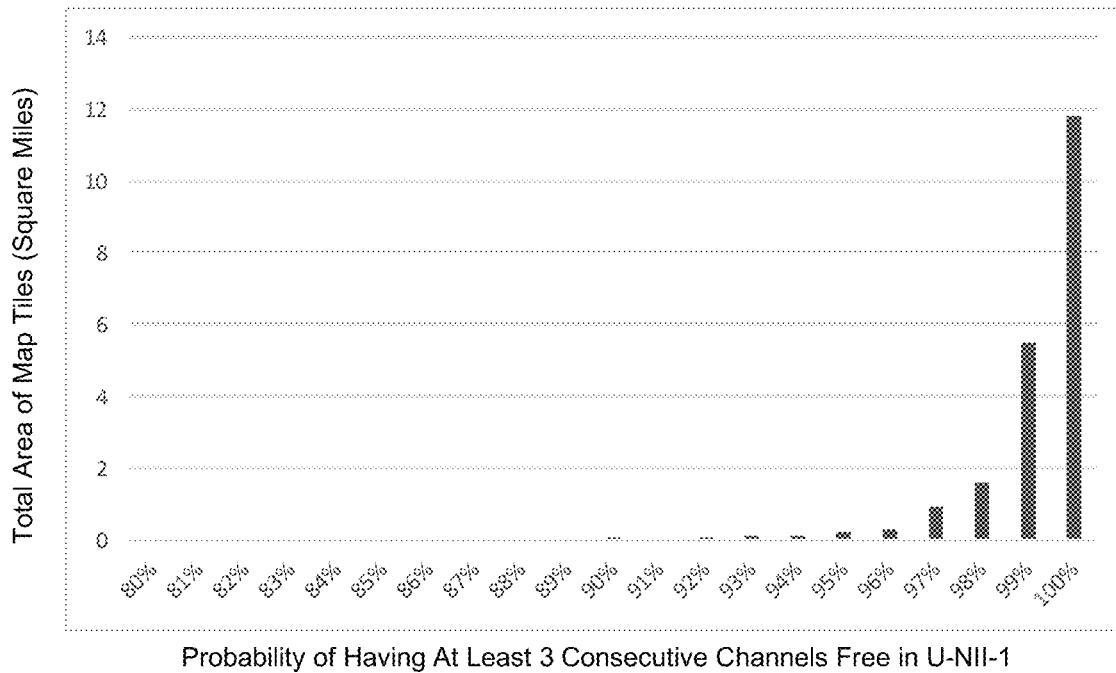
FIG. 13 depicts example charts indicating a total area of aggregated map tiles that, in example data, each share the same probability of having three or more channels free in different bands.
Figure 13:
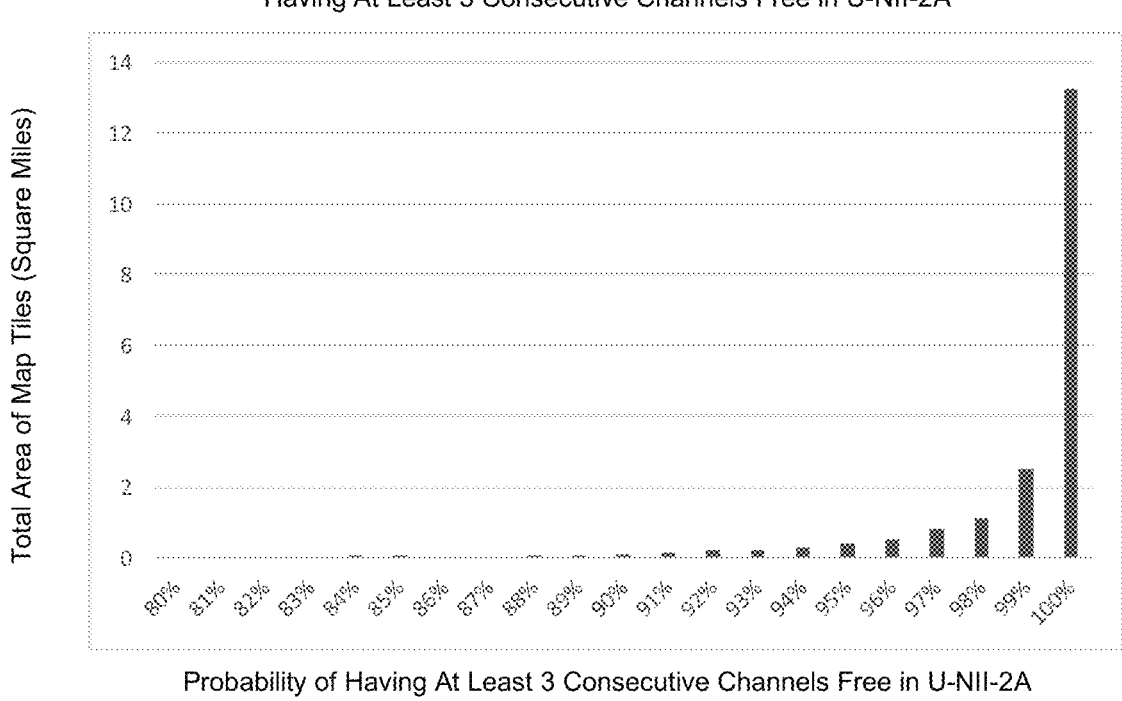

As mentioned above, the server 118 can also determine the probabilities of having at least three consecutive channels free in a band based on the probabilities of having each possible set of three consecutive channels free within that band. For example, the server 118 can combine a map tile's probability of having channels 36, 40, and 44 free with the map tile's probability of having channels 40, 44, and 48 free to determine the map tile's overall probability of having at least three consecutive channels free in the U-NII-1 band. The server 118 can determine the probabilities of having at least three consecutive channels free in pone or more bands for multiple map tiles 306. Accordingly, the server 118 can determine sizes of total areas covered in the aggregate by multiple map tiles 306 that each share the same probability of having at least three consecutive channels free in one or more bands. For example, FIG. 13 depicts charts generated by the server 118 from example aggregated Wi-Fi data 302 for map tiles 306 covering New York County, with a first chart indicating the total square mileage of aggregated map tiles 306 that each share the same probability of having three or more channels free in the U-NII-1 band, and a second chart indicating the total square mileage of aggregated map tiles 306 that each share the same probability of having three or more channels free in the U-NII-2A band.

In some examples, the server 118 can output charts, heat maps, and/or underlying data from the server's analysis as discussed above with respect to FIGS. 9-13 for manual review to identify LAA-safe channels. For example, such charts, heat maps, and/or other underlying data can be displayed in a user interface or be printed out after they have been generated by the server 118. Such heat maps, charts, and/or other data indicating LAA-safe channels can be used to estimate bandwidth gain if those channels were used for LAA transmissions.

The server 118 can also be configured to directly determine from an analysis of the aggregated Wi-Fi data 302 as described above with respect to FIGS. 9-13 that channels in a particular band, or a combination of bands, are safe to use for LAA transmissions in a geographical area. For example, the server 118 can be set to determine that channels or bands are LAA-safe when average utilization values 802 for channels are below 10%, such that the server 118 would find majority of the 5 GHz U-NII channels are LAA-safe when the server 118 finds the average utilization values 802 shown in FIG. 9. The server 118 may provide a recommendation regarding deployment of LAA-compatible hardware based on this analysis, and/or provide an estimate of a bandwidth gain using such channels could provide if used for LAA transmissions.

As another example, the server 118 can be set to determine that bands of channels are LAA-safe for CA when the CA analysis described above indicates that the probability of having at least a threshold number of consecutive channels free in a band exceeds a threshold value. For example, the server 118 can be configured to determine that bands are LAA-safe when there is at least at 90% chance that three consecutive channels will be free within a set of map tiles 306, such that the server 118 would find the U-NII-1 and U-NII-2A bands to be LAA-safe for CA based on the charts shown in FIG. 13. The server 118 may provide a recommendation regarding deployment of LAA-compatible hardware based on this analysis, and/or provide an estimate of a bandwidth gain using such channels could provide if used for LAA transmissions via CA.

As mentioned above, although the server 118 can perform the analyses described above from records 212 with respect to a geographical area over a certain period of time, in some examples the server 118 can perform these analyses based on records 212 corresponding to different periods of time to determine whether channels may be considered LAA-safe during some periods of time and not others.

Figure 14:
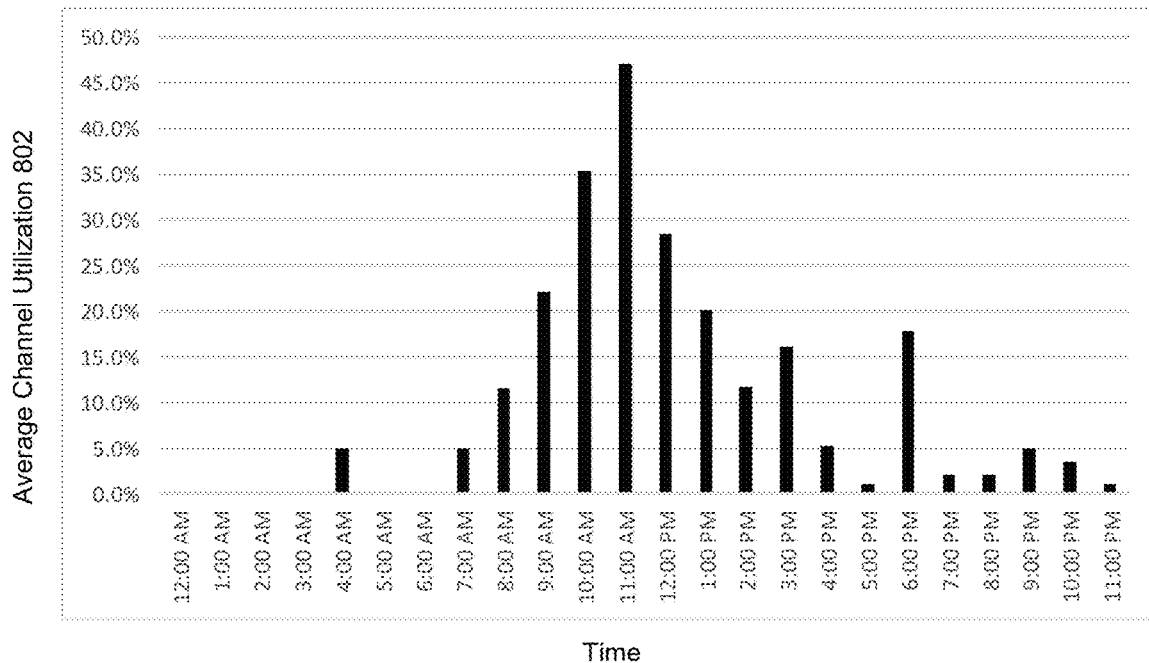
FIG. 14 shows an example of a server's analysis of records from map tiles covering the same location at various times of day.
Figure 14:
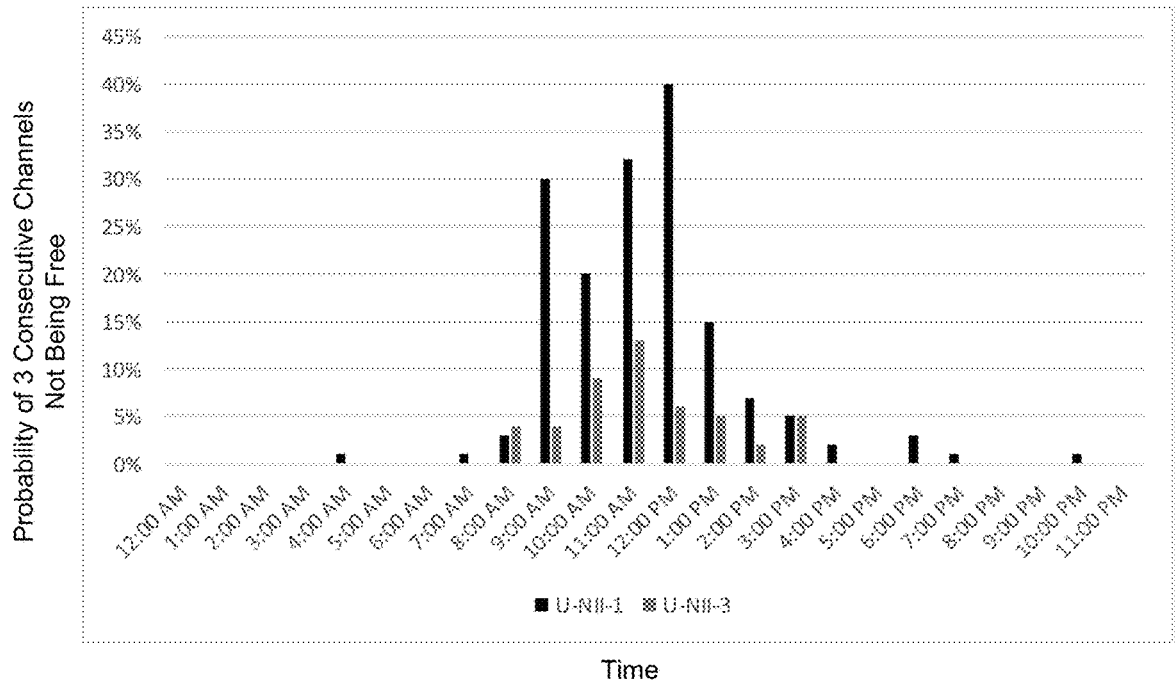

For example, FIG. 14 shows results of a server's analysis of records 212 from map tiles 306 covering the location of a convention center at various times of day. In the example of FIG. 14, the top chart shows hourly average channel utilization 802 values within the map tiles 306 for channel 36, and indicates that usage of channel 36 is much heavier during the middle of the day, especially near the lunch hour. Accordingly, the server 118 may determine that if the records 212 show high channel utilization values of some or all channels during periods when a convention is occurring, but low channel utilization values at other times, those channels should not be considered LAA-safe in the map tiles 306 covering the convention center when a convention is scheduled. The server 118, or other element of the telecommunication network 106, can instruct base stations 104 near the map tiles 306 covering the convention center not to use LAA during those times, or personnel can similarly configure the base stations 104 based on review of output from the server 118.

As another example, the bottom chart of FIG. 14 shows probabilities calculated by the server 118 that three of more consecutive channels in the U-NII-1 and U-NII-3 bands will not be free in the map tiles 306 covering the convention center, and would thus not be available for CA LAA transmissions. For instance, the chances that three or more consecutive channels in the U-NII-1 band will not be free are relatively high, especially between 9 AM and 1 PM. However, the bottom chart of FIG. 14 shows that the chances that three or more consecutive channels in the U-NII-3 band will not be free are relatively low, even during the middle of the day. Accordingly, the server 118, another element of the telecommunication network 106, or network personnel may configure base stations 104 near the map tiles 306 covering the convention center not to use CA for LAA transmissions with channels in the U-NII-1 band from 9 AM to 1 PM when conventions are scheduled, but permit the base stations 104 to use CA for LAA transmissions with channels in the U-NII-3 band during some or all of those hours.

In addition, in some examples the server 118 can use information about both the number of unique Wi-Fi access points 112 in a set of map tiles 306 and channel utilization information for those map tiles 306 to predict the likelihood of interference 116 in the future. The server's determination of a number of unique Wi-Fi access points 118 is discussed above with respect to FIG. 4. For example, the server 118 may determine that a first location with one hundred unique Wi-Fi access points 112 has a higher likelihood of interference 116 than a second location that has only one unique Wi-Fi access point 112, even if the channel utilization values are similar. Accordingly, the server's output may indicate or recommend that LAA not be deployed in the first location due to the higher likelihood of interference 116, but be deployed in the second location despite similar channel utilization values in the two locations.

Although the server 118 is described herein as analyzing data with respect to channels of the 5 GHz band, in some examples the server 118 can use the same methods to collect Wi-Fi records 204 with respect to channels 2.4 GHz spectrum, such that those channels can also be analyzed as described herein. For example, FIG. 9 indicates that the server 118 has collected Wi-Fi reports 204 containing records 212 associated with both 2.4 GHz channels and 5 GHz channels and has found numbers of unique Wi-Fi access points 112 and average channel utilization 802 values for 2.4 GHz channels and 5 GHz channels. The server 118 can accordingly use its analysis of 2.4 GHz channels and 5 GHz channels to compare the likelihood of LAA transmissions interfering with Wi-Fi transmissions across different combinations of channels.

Example Architecture

Figure 15:
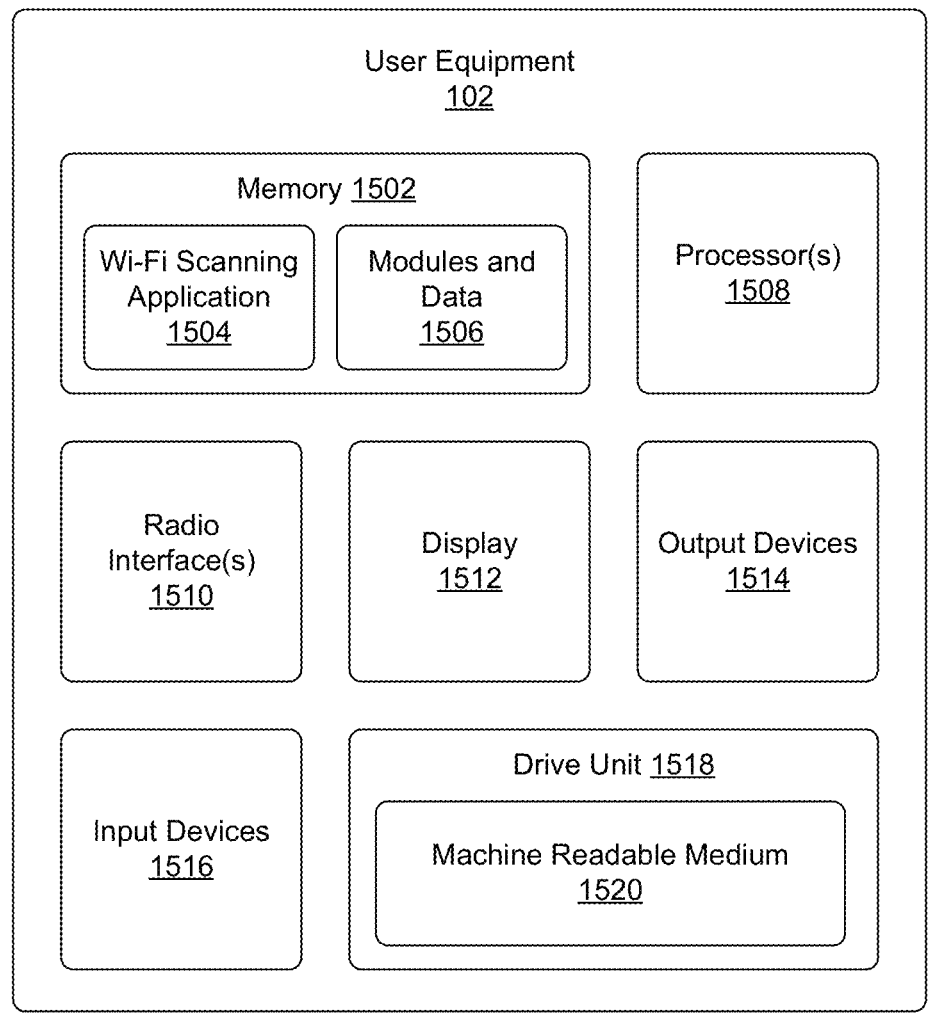
FIG. 15 depicts an example system architecture for a UE.

FIG. 15 depicts an example system architecture for a UE 102, in accordance with various examples. As shown, a UE 102 can include a memory 1502 that stores a Wi-Fi scanning application 1504 and other modules and data 1506, processor(s) 1508, radio interfaces 1510, a display 1512, output devices 1514, input devices 1516, and/or a drive unit 1518 including a machine readable medium 1520.

In various examples, memory 1502 can include system memory, which may be volatile (such as RAM), non-volatile (such as ROM, flash memory, etc.) or some combination of the two. Memory 1502 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the UE 102. Any such non-transitory computer-readable media may be part of the UE 102.

The memory 1502 can store computer-readable instructions and/or other data associated with a Wi-Fi scanning application 1504 configured to automatically scan for beacon signals 202 and submit Wi-Fi reports 204 to the server 118 as described above. In some examples, the Wi-Fi scanning application 1504 can be an application provided to the UE 102 by the server 118 or another element of the telecommunication network 106. For example, the telecommunication network 106 can use over-the-air updates or other distribution methods to provide the UE 102 with the Wi-Fi scanning application 1504. In some examples, the Wi-Fi scanning application 1504 can be part of a larger application with other features. For example, the Wi-Fi scanning application 1504 can be part of an application provided by the operator of the telecommunication network 106 that allows users to check their data usage, change their service plan, or access other information about their accounts with the operator of the telecommunication network 106. In other examples, the Wi-Fi scanning application 1504 can be part of the UE's firmware or operating system, and/or be other computer-executable instructions that cause hardware and/or software components of the UE 102 to scan for beacon signals 202 and submit Wi-Fi reports 204 to the server 118.

The memory 1502 can also store other modules and data 1506 that can be utilized by the UE 102 to perform or enable performing any action taken by the UE 102. The modules and data 1506 can include a UE platform and applications, and data utilized by the platform and applications.

In various examples, the processor(s) 1508 can be a central processing unit (CPU), a graphics processing unit (GPU), or both CPU and GPU, or any other type of processing unit. Each of the one or more processor(s) 1508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 1508 may also be responsible for executing all computer applications stored in the memory 1502, which can be associated with common types of volatile (RAM) and/or nonvolatile (ROM) memory.

The radio interfaces 1510 can include transceivers, modems, interfaces, antennas, and/or other components that perform or assist with scans for beacon signals 202 or other wireless communications with base stations 104 and/or Wi-Fi access points 112. For example, the UE 102 can have radio interfaces 1510 compatible with LTE, Wi-Fi, and/or any other type of wireless connection. In some examples, the UE 102 can also have wired data connection components that allow wired data connections to the Internet and/or other networks.

The display 1512 can be a liquid crystal display or any other type of display commonly used in UEs 102. For example, display 1512 may be a touch-sensitive display screen, and can then also act as an input device or keypad, such as for providing a soft-key keyboard, navigation buttons, or any other type of input.

The output devices 1514 can include any sort of output devices known in the art, such as a display 1512, speakers, a vibrating mechanism, and/or a tactile feedback mechanism. Output devices 1514 can also include ports for one or more peripheral devices, such as headphones, peripheral speakers, and/or a peripheral display.

The input devices 1516 can include any sort of input devices known in the art. For example, input devices 1516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 1520 can store one or more sets of instructions, such as software or firmware, that embodies any one or more of the methodologies or functions described herein. The instructions can also reside, completely or at least partially, within the memory 1502, processor(s) 1508, and/or radio interface(s) 1510 during execution thereof by the UE 102. The memory 1502 and the processor(s) 1508 also can constitute machine readable media 1520.

Figure 16:
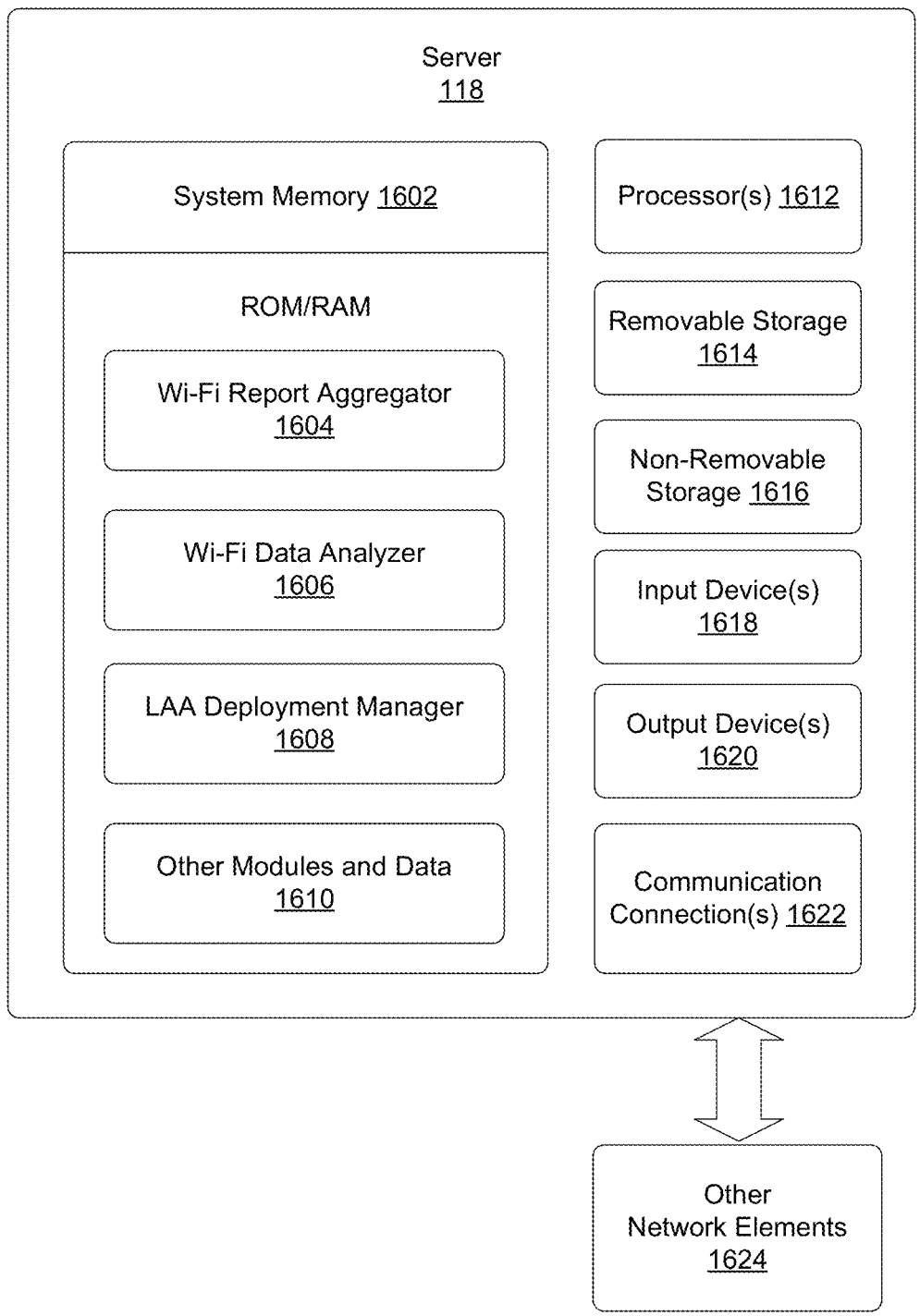
FIG. 16 depicts an example system architecture of a server.

FIG. 16 depicts an example system architecture of a server 118. The server 118 can be a computing device that has a system memory 1602. The system memory 1602 can store data for the server 118, including a Wi-Fi report aggregator 1604, a Wi-Fi data analyzer 1606, an LAA deployment manager 1608, and/or other modules and data 1610. The server 118 can also include processor(s) 1612, removable storage 1614, non-removable storage 1616, input device(s) 1618, output device(s) 1620, and/or communication connections 1622 for communicating with other network elements 1624.

In various examples, system memory 1602 can be volatile (such as RAM), non-volatile (such as ROM, flash memory, etc.), or some combination of the two. Example system memory 1602 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The Wi-Fi report aggregator 1604 can receive Wi-Fi reports 204 submitted by UEs 102 and use them to generate aggregated Wi-Fi data 302. In some examples, the Wi-Fi report aggregator 1604 can generate a master set of aggregated Wi-Fi data 302, but be configured to filter or search the master set to obtain records 212 corresponding to desired time periods, geographical locations, and/or any other criteria. For example, the Wi-Fi report aggregator 1604 can be configured to find records 212 in the aggregated Wi-Fi data that are specific to individual map tiles 306 or a set of map tiles 306 covering a particular geographical area. In other examples, the Wi-Fi report aggregator 1604 can generate different sets of aggregated Wi-Fi data 302 that are specific to certain periods of time, geographical locations, and/or any other criteria.

The Wi-Fi data analyzer 1606 can use records in aggregated Wi-Fi data 302 to generate data that can determine whether one or more channels of the unlicensed spectrum 110 are LAA-safe. In various examples, the Wi-Fi data analyzer 1606 can determine numbers of unique Wi-Fi access points 112 that are using individual channels in one or more map tiles 306, whether individual channels are free in one or more map tiles, determine channel utilization 702 values for individual records 212, determine average channel utilization 802 values for one or more map tiles 306, and/or determine the probabilities of at least a threshold number of consecutive channels being free in one or more bands with respect to one or more map tiles 306. The Wi-Fi data analyzer 1606 can be configured to compare the counts, values, and/or probabilities it generates against threshold values to directly identify whether certain channels or bands in the unlicensed spectrum 110 are LAA-safe in one or more map tiles 306. The Wi-Fi data analyzer 1606 can also be configured to output heat maps, charts, and/or other types of data that can illustrate the counts, values, and/or probabilities it generates. The Wi-Fi data analyzer 1606 can be configured to analyze aggregated Wi-Fi data 302 across any time period, such as days or weeks, or more granularly such as hour by hour.

The LAA deployment manager 1608 can, based on a determination from the Wi-Fi data analyzer or other source that one or more channels of the unlicensed spectrum 110 are LAA-safe with respect to one or more map tiles 306, provide a recommendation or other output indicating that LAA-capable base stations 104 that can use the LAA-safe channels for LAA transmissions with UEs 102 can be deployed to cover those map tiles 306. For example, recommendations output by the LAA deployment manager 1608 can be instructions or other information for LAA hardware deployment, and may identify which channels should be used for LAA transmissions and/or restrictions on their use, such as during specific times of day. The recommendations may also provide an estimate of the bandwidth gain such LAA transmissions could provide. In other examples, the LAA deployment manager 1608 may, based on the server's determinations that channels are LAA-safe in the geographical area, output instructions to base stations 104 and/or UEs 102 that enable options or settings to use LAA transmissions when appropriate in the geographical area.

The other modules and data 1610 can be utilized by the server 118 to perform or enable performing any action taken by the server 118. The other modules and data 1610 can include a platform and applications, and data utilized by the platform and applications.

In some embodiments, the processor(s) 1612 can be a central processing unit (CPU), a graphics processing unit (GPU), both CPU and GPU, or other processing unit or component known in the art.

The server 118 can also include additional data storage devices (removable and/or non-removable) such as, for example, magnetic disks, optical disks, or tape. Such additional storage is illustrated in FIG. 16 by removable storage 1614 and non-removable storage 1616. Computer storage media may include volatile and nonvolatile, removable and non-removable media implemented in any method or technology for storage of information, such as computer readable instructions, data structures, program modules, or other data. System memory 1602, removable storage 1614 and non-removable storage 1616 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the server 118. Any such computer-readable storage media can be part of the server 118. In various examples, any or all of system memory 1602, removable storage 1614, and non-removable storage 1616, store programming instructions which, when executed, implement some or all of the herein-described operations of the server 118.

In some examples, the server 118 can also have input device(s) 1618, such as a keyboard, a mouse, a touch-sensitive display, voice input device, etc., and/or output device(s) 1620 such as a display, speakers, a printer, etc. These devices are well known in the art and need not be discussed at length here.

The server 118 can also contain communication connections 1622 that allow the server 118 to communicate with other network elements 1624 such as UEs 102, base stations 104, and other elements of the telecommunication network 106. For example, the server 118 can receive Wi-Fi reports 204 from UEs 102 via the communication connections 1622.

Example Operations

Figure 17:
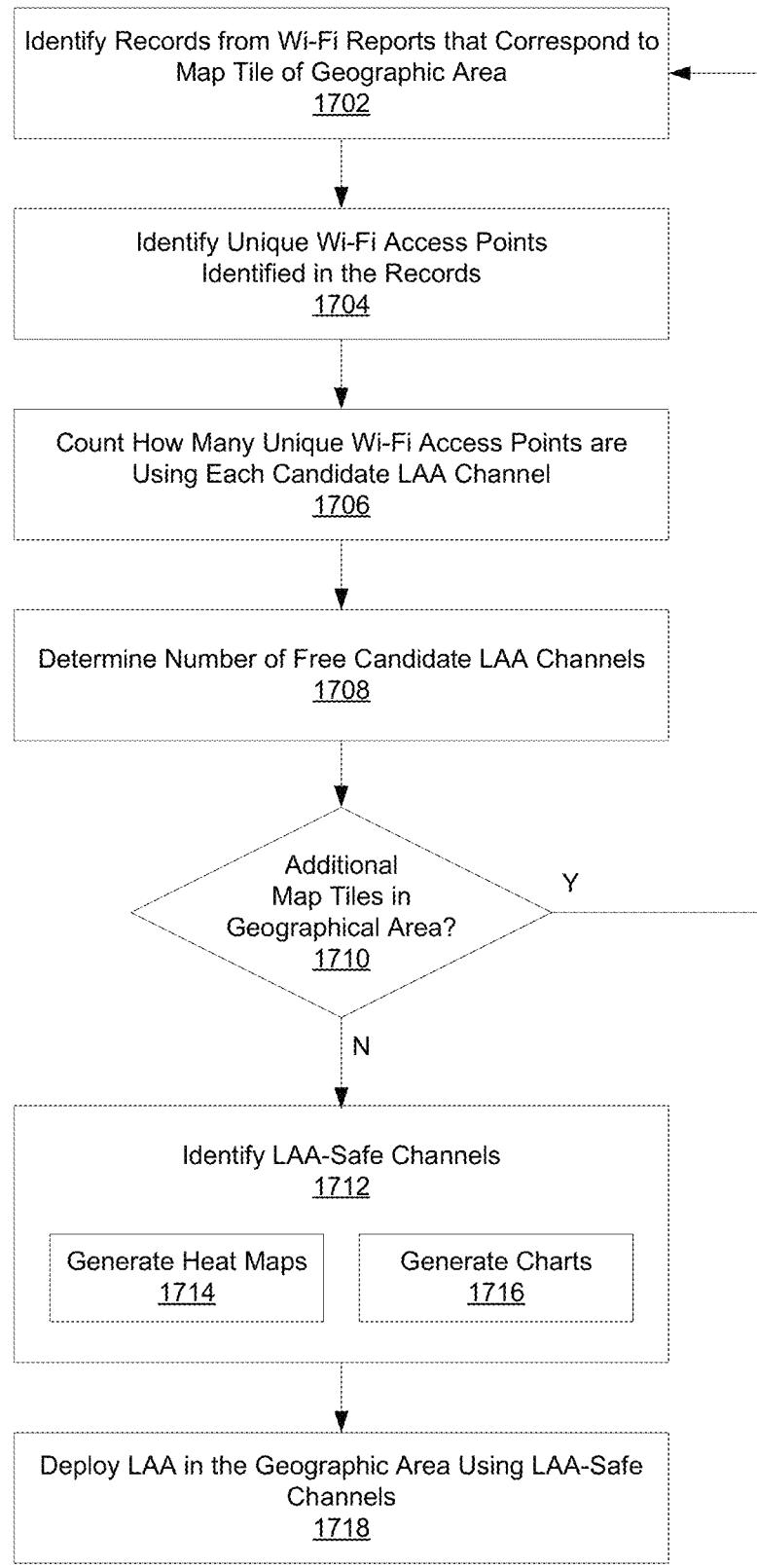
FIG. 17 depicts a flow chart of a first method for identifying LAA-safe channels in one or more bands of the unlicensed spectrum.

FIG. 17 depicts a flow chart of a first method for identifying LAA-safe channels in one or more bands of the unlicensed spectrum 110. In some examples, the method of FIG. 17 can be used to evaluate, with respect to a geographical area, whether candidate LAA channels are LAA-safe, such as 5 GHz candidate LAA channels in the U-NII-1, U-NII-2A, U-NII-2C, and/or U-NII-3 bands.

At block 1702, a server 118 can identify records 212 from crowd-sourced Wi-Fi reports 204 submitted by UEs 102 that correspond to a map tile 306 within the geographical area. The records 212 can be filtered from a master set of aggregated Wi-Fi data 302 built from the crowd-sourced Wi-Fi reports 204, or retrieved from a set of aggregated Wi-Fi data 302 that is specific to the geographical area. The records 212 can include geolocation data 216 indicating that they correspond to scans for beacon signals 202 that were performed by UEs 102 within an area covered by the map tile 306.

At block 1704, the server 118 can identify unique Wi-Fi access points 112 within the set of records found at block 1702. For example, the server 118 can use BSSIDs 206, SSIDs 208, and/or other data in the records 212 that identify the records 212 as corresponding to beacon signals 202 broadcast by different Wi-Fi access points 112.

At block 1706, the server 118 can use channel frequency 214 data in the records 212 to count how many of unique Wi-Fi access points 112 were using each of the candidate LAA channels.

At block 1708, the server 118 can use the number of unique Wi-Fi access points 112 that were using each of the candidate LAA channels in a particular band, relative to the total number of candidate LAA channels in that band, to determine how many candidate LAA channels in that band are free and not being used by any Wi-Fi access points 112 in the map tile 306.

At block 1710, the server 118 can determine if records 212 from any other map tiles 306 in the geographical area have not yet been analyzed at blocks 1702-1708. If records 212 from other map tiles 306 are still to be analyzed, the server 118 can repeat blocks 1702-1708 for the records 212 from those map tiles 306. If records 212 from all of the map tiles 306 covering the geographical area are been analyzed at blocks 1702-1708, the server 118 can continue to block 1712.

At block 1712, the server 118 can use the number of candidate LAA channels that are free in one or more bands, as determined at block 1708, to identify which of those candidate LAA channels, if any, are LAA-safe in the geographical area. In some examples, at block 1714 the server 118 can generate heat maps 500 showing the number of free candidate LAA channels in one or more bands with respect to different map tiles 306 covering the geographical area, which can be used to determine if certain candidate LAA channels or bands are LAA-safe across the geographical area. In some examples, at block 1716 the server 118 can generate charts, for example as discussed above with respect to FIG. 6, that indicate a total size or percentage of the map tiles 306 that have each number of candidate LAA channels in one or more bands occupied.

In some examples, the server 118 can compare the counts or percentages it generates with respect to candidate LAA channels and/or bands over one or more map tiles against threshold values, and if the counts or percentages meet the threshold values, the server 118 can determine that the candidate LAA channels and/or bands are LAA-safe in the geographical area.

At block 1718, after identification of LAA-safe channels, the server 118 can output information indicating that LAA-capable base stations 104 can be deployed and/or enabled in the geographical area to use the LAA-safe channels when exchanging LAA transmissions. For example, the server 118 can output identifications of the LAA-safe channels for the geographical area, heat maps, charts, estimates of gains that LAA transmissions over the LAA-safe channels would provide, deployment recommendations, setting changes, and/or any other output. Accordingly, based on the output, base stations 104 can be installed, upgraded, or reconfigured in the geographical area to permit LAA transmissions using the LAA-safe channels.

Figure 18:
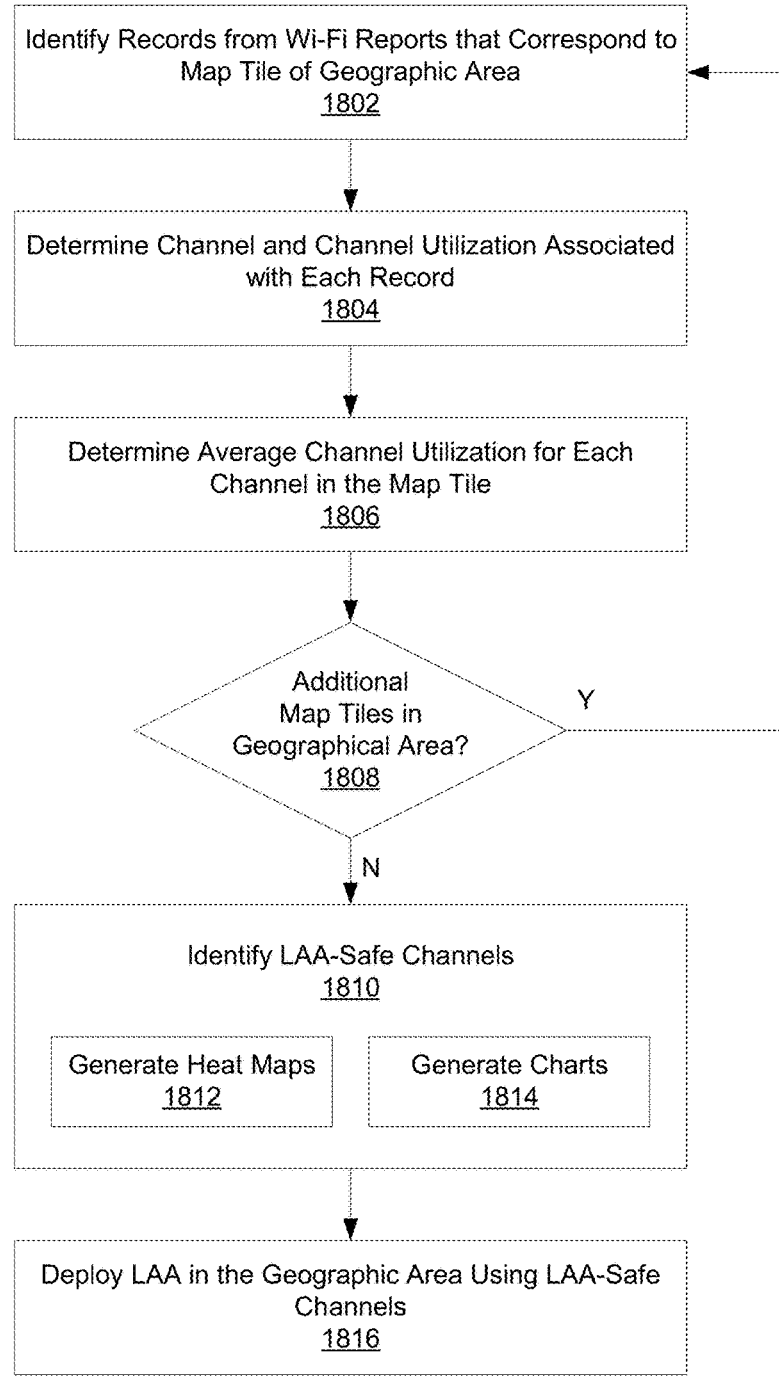
FIG. 18 depicts a flow chart of a second method for identifying LAA-safe channels in one or more bands of the unlicensed spectrum.

FIG. 18 depicts a flow chart of a second method for identifying LAA-safe channels in one or more bands of the unlicensed spectrum 110. In some examples, the method of FIG. 18 can be used to evaluate, with respect to a geographical area, whether candidate LAA channels are LAA-safe, such as 5 GHz candidate LAA channels in the U-NII-1, U-NII-2A, U-NII-2C, and/or U-NII-3 bands.

At block 1802, a server 118 can identify records 212 from crowd-sourced Wi-Fi reports 204 submitted by UEs 102 that correspond to a map tile 306 within the geographical area. The records 212 can be filtered from a master set of aggregated Wi-Fi data 302 built from the crowd-sourced Wi-Fi reports 204, or retrieved from a set of aggregated Wi-Fi data 302 that is specific to the geographical area. The records 212 can include geolocation data 216 indicating that they correspond to scans for beacon signals 202 that were performed by UEs 102 within an area covered by the map tile 306.

At block 1804, the server 118 can determine a channel and a channel utilization 702 value associated with each record 212. For example, a record 212 can include a channel frequency 214 at which a corresponding beacon signal 202 was received, and the server 118 can find a channel that maps to that channel frequency 214. A record 212 can also include a BSS Load 210 element that can express channel utilization information. For example, a record's BSS Load 210 element can be a QBSS Load element that has channel utilization information included as a middle byte of a five-byte sequence. Accordingly, the server 118 can extract that byte and convert it to a channel utilization 702 value.

At block 1806, after having determined channels and channel utilization 702 values for each record 212, the server 118 can average the channel utilization 702 values to calculate an average channel utilization 802 for each candidate LAA channel in the map tile 306.

At block 1808, the server 118 can determine if records 212 from any other map tiles 306 in the geographical area have not yet been analyzed at blocks 1802-1806. If records 212 from other map tiles 306 are still to be analyzed, the server 118 can repeat blocks 1802-1806 for the records 212 from those map tiles 306. If records 212 from all of the map tiles 306 covering the geographical area are been analyzed at blocks 1802-1806, the server 118 can continue to block 1810.

At block 1810, the server 118 can use the average channel utilization 802 values for the candidate LAA channels, as determined at block 1806, to identify which of those candidate LAA channels, if any, are LAA-safe in the geographical area. In some examples, at block 1812 the server 118 can generate heat maps showing the average channel utilization 802 values for channels of one or more bands with respect to different map tiles 306 covering the geographical area, which can be used to determine if certain candidate LAA channels or bands are LAA-safe across the geographical area. In some examples, at block 1814 the server 118 can generate charts. For example, the server 118 can generate a chart as discussed above with respect to FIG. 8 that indicates the average channel utilization 802 with respect to multiple candidate LAA channels, which can be used to determine if certain candidate LAA channels or bands are LAA-safe across the geographical area. As another example, the server 118 can generate an area chart indicating a total size or percentage of the map tiles 306 that have a common average channel utilization 802 value, which can be used to determine if certain candidate LAA channels or bands are LAA-safe across the geographical area.

In some examples, the server 118 can compare the average channel utilization 802 values it generates with respect to candidate LAA channels and/or bands over one or more map tiles against threshold percentages, and if the average channel utilization 802 values meet the threshold percentages, the server 118 can determine that the candidate LAA channels and/or bands are LAA-safe in the geographical area.

At block 1816, after identification of LAA-safe channels, the server 118 can output information indicating that LAA-capable base stations 104 can be deployed and/or enabled in the geographical area to use the LAA-safe channels when exchanging LAA transmissions. For example, the server 118 can output identifications of the LAA-safe channels for the geographical area, heat maps, charts, estimates of gains that LAA transmissions over the LAA-safe channels would provide, deployment recommendations, setting changes, and/or any other output. Accordingly, based on the output, base stations 104 can be installed, upgraded, or reconfigured in the geographical area to permit LAA transmissions using the LAA-safe channels.

Figure 19:
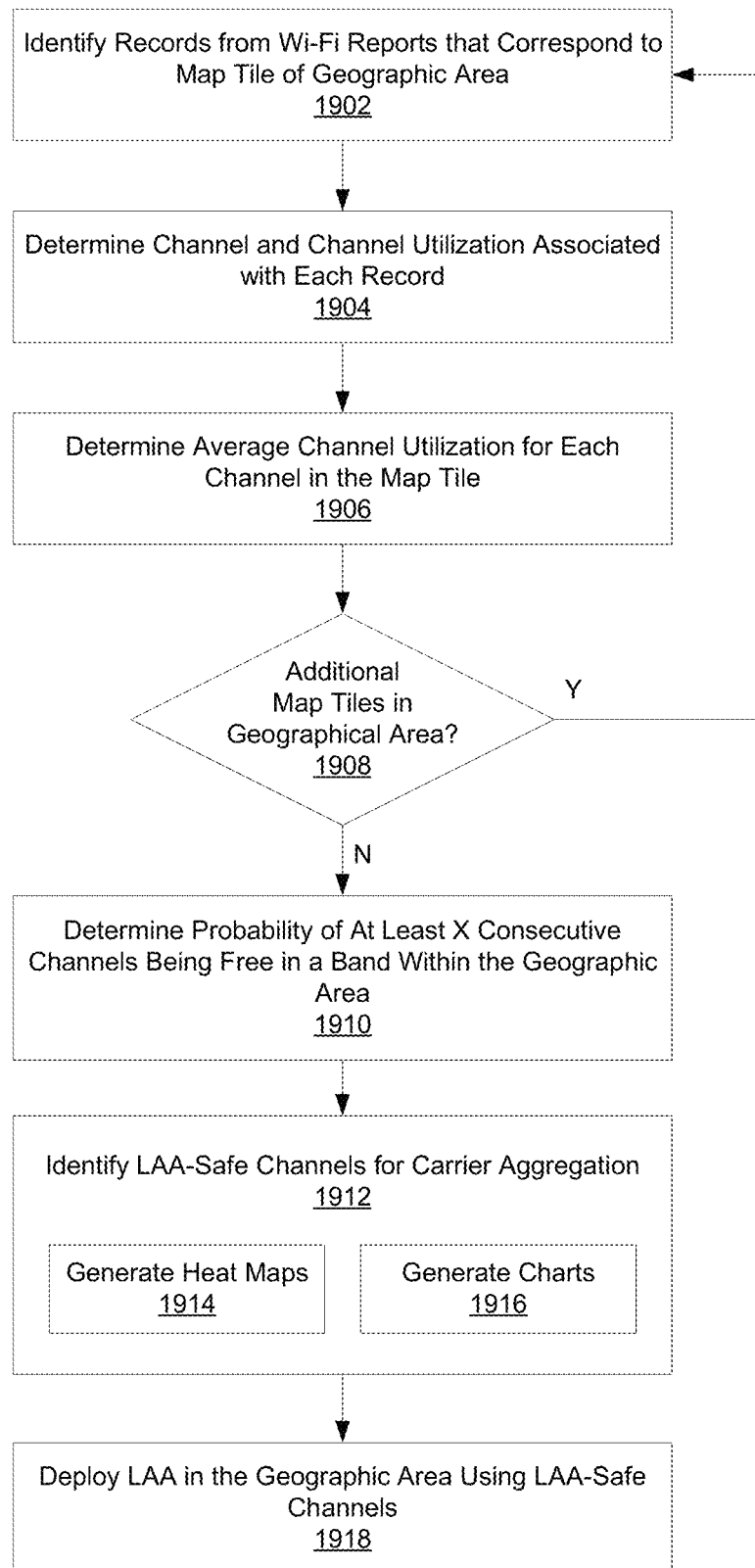
FIG. 19 depicts a flow chart of a method for identifying LAA-safe bands of channels in the unlicensed spectrum in which at least a predetermined number of consecutive channels are expected to be free for carrier aggregation (CA) during LAA transmissions.

FIG. 19 depicts a flow chart of a method for identifying LAA-safe bands of channels in the unlicensed spectrum 110 in which at least a predetermined number of consecutive channels are expected to be free for carrier aggregation (CA) during LAA transmissions. In some examples, the method of FIG. 19 can be used to evaluate, with respect to a geographical area, whether three or more consecutive candidate LAA channels are likely to be free, for example in the 5 GHz U-NII-1, U-NII-2A, U-NII-2C, and/or U-NII-3 bands.

At block 1902, a server 118 can identify records 212 from crowd-sourced Wi-Fi reports 204 submitted by UEs 102 that correspond to a map tile 306 within the geographical area. The records 212 can be filtered from a master set of aggregated Wi-Fi data 302 built from the crowd-sourced Wi-Fi reports 204, or retrieved from a set of aggregated Wi-Fi data 302 that is specific to the geographical area. The records 212 can include geolocation data 216 indicating that they correspond to scans for beacon signals 202 that were performed by UEs 102 within an area covered by the map tile 306.

At block 1904, the server 118 can determine a channel and a channel utilization 702 value associated with each record 212. For example, a record 212 can include a channel frequency 214 at which a corresponding beacon signal 202 was received, and the server 118 can find a channel that maps to that channel frequency 214. A record 212 can also include a BSS Load 210 element that can express channel utilization information. For example, a record's BSS Load 210 element can be a QBSS Load element that has channel utilization information included as a middle byte of a five-byte sequence. Accordingly, the server 118 can extract that byte and convert it to a channel utilization 702 value.

At block 1906, after having determined channels and channel utilization 702 values for each record 212, the server 118 can average the channel utilization 702 values to calculate an average channel utilization 802 for each candidate LAA channel in the map tile 306.

At block 1908, the server 118 can determine if records 212 from any other map tiles 306 in the geographical area have not yet been analyzed at blocks 1902-1906. If records 212 from other map tiles 306 are still to be analyzed, the server 118 can repeat blocks 1902-1906 for the records 212 from those map tiles 306. If records 212 from all of the map tiles 306 covering the geographical area are been analyzed at blocks 1902-1906, the server 118 can continue to block 1910.

At block 1910, the server 118 can use the average channel utilization 802 values for the candidate LAA channels, as determined at block 1906, to determine probabilities that at least three (or any other desired number) of consecutive channels will be free in one or more bands. As discussed above with respect to FIG. 11, the server 118 can calculate probabilities that each possible set of three consecutive channels will be free in a band, then combine those probabilities to find an overall probability that three of more consecutive channels will be free in the band.

At block 1912, the server 118 can identify which bands, if any, have LAA-safe channels in the geographical area for CA transmissions via LAA, based on the probabilities of at least three (or any other desired number) of consecutive candidate LAA channels being free in the band. In some examples, at block 1914 the server 118 can generate heat maps showing the probabilities of at least three consecutive candidate LAA channels being free in one or more bands, which can be used to determine if certain bands are LAA-safe for CA transmissions via LAA across the geographical area. In some examples, at block 1916 the server 118 can generate charts. For example, the server 118 can generate charts as discussed above with respect to FIG. 13 that indicate a total size or percentage of the map tiles 306 that have a common probability of having at least three consecutive candidate LAA channels free in one or more bands, which can be used to determine if certain bands are LAA-safe for CA transmissions via LAA across the geographical area.

In some examples, the server 118 can compare the probabilities of at least three consecutive candidate LAA channels being free in one or more bands over one or more map tiles against threshold probabilities, and if the probabilities meet the threshold probabilities, the server 118 can determine that the candidate LAA bands are LAA-safe in the geographical area.

At block 1918, after identification of LAA-safe bands for CA transmissions via LAA, the server 118 can output information indicating that LAA-capable base stations 104 can be deployed and/or enabled in the geographical area to use the LAA-safe bands when using CA to exchange LAA transmissions. For example, the server 118 can output identifications of the LAA-safe bands for the geographical area, heat maps, charts, estimates of gains that CA-based LAA transmissions would provide, deployment recommendations, setting changes, and/or any other output. Accordingly, based on the output, base stations 104 can be installed, upgraded, or reconfigured in the geographical area to permit CA transmissions using channels of the LAA-safe bands.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
  receiving, by a computing device associated with a telecommunication network, a plurality of records from plurality of user equipments (UEs) that include information about Wi-Fi networks offered by Wi-Fi access points over channels of an unlicensed spectrum and geolocation data indicating where individual ones of the plurality of UEs detected the Wi-Fi networks;
  identifying, by the computing device, a set of the plurality of records in which the geolocation data corresponds to a geographical area;
  determining, by the computing device, average channel utilization values for individual ones of the channels within the geographical area based on channel utilization information in the set of the plurality of records; and
  generating, by the computing device, output data indicating that Licensed Assisted Access (LAA) transmissions using Long-Term Evolution (LTE) protocols over one or more of the channels of the unlicensed spectrum will not interfere with Wi-Fi transmissions using the one or more channels within the geographical area,
  wherein the output data includes an estimate of a bandwidth gain that would be provided by the LAA transmissions.

2. The method of claim 1, further comprising:
  determining, by the computing device, a probability of at least a predefined number of consecutive channels being free in a band within the geographical area based on the average channel utilization values; and
  determining, by the computing device, that the probability of at least a predefined number of consecutive channels being free in a band within the geographical area exceeds a threshold percentage,
  wherein the output indicates that the one or more of the channels of the unlicensed spectrum are in the band and can be used for carrier aggregation in the band during the LAA transmissions.

3. The method of claim 1, wherein the output data includes an instruction to one or more base stations of the telecommunication network proximate to the geographical area that permits the one or more base stations to use one or more of the channels of the unlicensed spectrum during the LAA transmissions with individual ones of the plurality of UEs.

4. The method of claim 1, wherein the output data includes a heat map that plots the average channel utilization values associated with the one or more channels over the geographical area.

5. The method of claim 1, wherein the output data includes a chart that indicates the average channel utilization values for the individual ones of the channels within the geographical area.

6. The method of claim 1, wherein the output data includes a chart that indicates portions of the geographical area that correspond to common ones of the average channel utilization values associated with the one or more channels.

7. The method of claim 1, wherein the computing device performs the identifying, the determining, and the generating based on subsets of the set of records that correspond to individual ones of a plurality of map titles covering the geographical area.

8. The method of claim 1, wherein the channels of the unlicensed spectrum are channels in a 5 GHz band.

9. The method of claim 1, wherein determining the average channel utilization values for individual ones of the channels within the geographical area comprises:
  identifying, by the computing device, channels associated with individual ones of the set of the plurality of records based on channel frequency information included in the set of the plurality of records;

calculating, by the computing device, channel utilization values for the individual ones of the set of the plurality of records based on the channel utilization information; and averaging, by the computing device, the channel utilization values for individual ones of the channels to generate the average channel utilization values.

10. The method of claim 9, wherein the channel frequency information is included within Basic Service Set (BSS) Load elements of the plurality of records.

11. The method of claim 1, wherein the computing device generates the output data with respect to the channels of the unlicensed spectrum for a plurality of different time periods.

12. A computing device, comprising:
one or more processors; and
memory storing computer-executable instructions that, when executed by the one or more processors, cause the computing device to:
receive a plurality of records from plurality of user equipments (UEs) that include information about Wi-Fi networks offered by Wi-Fi access points over channels of an unlicensed spectrum and geolocation data indicating where individual ones of the plurality of UEs detected the Wi-Fi networks;
identify a set of the plurality of records in which the geolocation data corresponds to a geographical area;
determine average channel utilization values for individual ones of the channels within the geographical area based on channel utilization information in the set of the plurality of records;
generate output data indicating that Wi-Fi transmissions over one or more of the channels of the unlicensed spectrum are below a threshold value such that Licensed Assisted Access (LAA) transmissions using Long-Term Evolution (LTE) protocols may operate over the one or more of the channels of the unlicensed spectrum;
determine a probability of at least a predefined number of consecutive channels being free in a band within the geographical area based on the average channel utilization values; and
determine that the probability of at least a predefined number of consecutive channels being free in a band within the geographical area exceeds a threshold percentage,
wherein the output data indicates that the one or more of the channels of the unlicensed spectrum are in the band and can be used for carrier aggregation in the band during the LAA transmissions.

13. The computing device of claim 12, wherein the output data includes an instruction to one or more base stations of a telecommunication network proximate to the geographical area that permits the one or more base stations to use one or more of the channels of the unlicensed spectrum during the LAA transmissions with individual ones of the plurality of UEs.

14. The computing device of claim 12, wherein the output data includes at least one of a heat map that plots the average channel utilization values associated with the one or more channels over the geographical area, a first chart that indicates the average channel utilization values for the individual ones of the channels within the geographical area, or a second chart that indicates portions of the geographical area that correspond to common ones of the average channel utilization values associated with the one or more channels.

15. One or more non-transitory computer-readable media storing computer-executable instructions that, when executed by one or more processors of a computing device, cause the computing device to perform operations comprising:
receiving a plurality of records from plurality of user equipments (UEs) that include information about Wi-Fi networks offered by Wi-Fi access points over channels of an unlicensed spectrum and geolocation data indicating where individual ones of the plurality of UEs detected the Wi-Fi networks;
identifying a set of the plurality of records in which the geolocation data corresponds to a geographical area;
determining average channel utilization values for individual ones of the channels within the geographical area based on channel utilization information in the set of the plurality of records;
generating output data indicating that Wi-Fi transmissions over one or more of the channels of the unlicensed spectrum are below a threshold value such that Licensed Assisted Access (LAA) transmissions using Long-Term Evolution (LTE) protocols may operate over the one or more of the channels of the unlicensed spectrum;
determining a probability of at least a predefined number of consecutive channels being free in a band within the geographical area based on the average channel utilization values; and
determining that the probability of at least a predefined number of consecutive channels being free in a band within the geographical area exceeds a threshold percentage,
wherein the output indicates that the one or more of the channels of the unlicensed spectrum are in the band and can be used for carrier aggregation in the band during the LAA transmissions.

16. The one or more non-transitory computer-readable media of claim 15, wherein the output data includes an instruction to one or more base stations of a telecommunication network proximate to the geographical area that permits the one or more base stations to use one or more of the channels of the unlicensed spectrum during the LAA transmissions with individual ones of the plurality of UEs.

17. The one or more non-transitory computer-readable media of claim 15, wherein the output data includes at least one of a heat map that plots the average channel utilization values associated with the one or more channels over the geographical area, a first chart that indicates the average channel utilization values for the individual ones of the channels within the geographical area, or a second chart that indicates portions of the geographical area that correspond to common ones of the average channel utilization values associated with the one or more channels.

* * * * *